(12) United States Patent
Nakagawa et al.

(10) Patent No.: US 8,151,047 B2
(45) Date of Patent: Apr. 3, 2012

(54) STORAGE SYSTEM AND MANAGEMENT METHOD THEREOF

(75) Inventors: Hirotaka Nakagawa, Sagamihara (JP); Masayasu Asano, Yokohama (JP); Yuichi Taguchi, Sagamihara (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 470 days.

(21) Appl. No.: 12/014,924

(22) Filed: Jan. 16, 2008

(65) Prior Publication Data

US 2009/0031320 A1    Jan. 29, 2009

(30) Foreign Application Priority Data

Jul. 26, 2007    (JP) ................................ 2007-194931

(51) Int. Cl.
G06F 12/16    (2006.01)
(52) U.S. Cl. ......................... 711/114; 711/162; 709/224
(58) Field of Classification Search .................. None
See application file for complete search history.

(56) References Cited

U.S. PATENT DOCUMENTS

| 7,085,883 | B1 * | 8/2006 | Dalgic et al. | 711/114 |
| 7,600,072 | B2 * | 10/2009 | Miyazaki et al. | 711/112 |
| 2003/0204583 | A1 * | 10/2003 | Kaneda et al. | 709/223 |
| 2003/0204597 | A1 * | 10/2003 | Arakawa et al. | 709/226 |
| 2004/0064610 | A1 | 4/2004 | Fukuzawa et al. | |
| 2004/0243699 | A1 * | 12/2004 | Koclanes et al. | 709/224 |
| 2006/0074957 | A1 * | 4/2006 | Yamamoto et al. | 707/101 |
| 2006/0112247 | A1 * | 5/2006 | Ramany et al. | 711/165 |
| 2006/0179220 | A1 * | 8/2006 | Soejima et al. | 711/114 |
| 2006/0206678 | A1 | 9/2006 | Miki | |
| 2006/0265497 | A1 * | 11/2006 | Ohata et al. | 709/224 |
| 2006/0271758 | A1 | 11/2006 | Innan et al. | |
| 2007/0027985 | A1 * | 2/2007 | Ramany et al. | 709/224 |
| 2008/0104347 | A1 | 5/2008 | Iwamura et al. | |
| 2008/0115008 | A1 * | 5/2008 | Daftardar | 714/3 |

FOREIGN PATENT DOCUMENTS

JP    10-283272    10/1998
JP    2006-011874    1/2006

* cited by examiner

*Primary Examiner* — Kaushikkumar Patel
(74) *Attorney, Agent, or Firm* — Antonelli, Terry, Stout & Kraus, LLP.

(57) ABSTRACT

A storage system comprises a first storage apparatus having a volume for a host computer, a second storage apparatus connected to the first storage apparatus, and having a volume having a pair relationship with a first volume in the first storage apparatus, and a management apparatus connected to the first storage apparatus and the second storage apparatus. The management apparatus includes a user interface for setting an attribute of a function related to the volume of the first storage apparatus and an attribute of a function related to the volume of the second storage apparatus. The management apparatus compares the attribute of the function related to the first volume and the attribute of the function related to the second volume, and outputs the result of the comparison to the user interface.

8 Claims, 23 Drawing Sheets

FIG.5

APPARATUS MANAGEMENT TABLE 500

| APPARATUS ID (501) | TYPE (502) | APPARATUS IDENTIFYING INFORMATION (503) | IP ADDRESS (504) | FUNCTION ID (505) |
|---|---|---|---|---|
| ST1 | STORAGE | VENDOR A. MODEL A. SERIAL NUMBER AD1 | 12.12.12.12 | PPC |
|  |  |  |  | DCR |
|  |  |  |  | LUSE |
| ST2 | STORAGE | VENDOR B. MODEL A. SERIAL NUMBER BG2 | 12.12.13.10 | PPC |
|  |  |  |  | DCR |
|  |  |  |  | LUSE |
| H1 | HOST | host-121 | 12.12.12.33 | – |

FIG.6

VOLUME ALLOCATION MANAGEMENT TABLE 600

| STORAGE APPARATUS ID (601) | VOLUME ID (602) | CAPACITY (603) | AG ID (604) | ALLOCATION DESTINATION (605) | APPLICATION PROGRAM (606) | LOGICAL DRIVE ID (607) |
|---|---|---|---|---|---|---|
| ST1 | VOL001 | 100GB | AG1 | H1 | AP1 | D: |
| ST1 | VOL002 | 20GB | AG1 | H2 | AP22 | E: |
| ST2 | VOL002 | 100GB | AG2 | H1 | AP1 | D: |
| ST2 | VOL003(LUSE) | 200GB | (LUSE) | H2 | AP33 | G: |

FIG.7

STORAGE AREA CONFIGURATION MANAGEMENT TABLE 700

| STORAGE APPARATUS ID | ArrayGroup ID | LOGICAL STORAGE CAPACITY | RAID Level | DiskID | PHYSICAL STORAGE CAPACITY OF DISK |
|---|---|---|---|---|---|
| ST1 | AG1 | 150GB | RAID5 3D+1P | Disk001 | 50GB |
| | | | | Disk002 | 50GB |
| | | | | Disk003 | 50GB |
| | | | | Disk004 | 50GB |
| ST1 | | | | Disk005 | 50GB |
| | | | | Disk006 | 50GB |
| | | | | Disk007 | 50GB |
| ST2 | AG2 | 150GB | RAID5 4D+1P | Disk010 | 50GB |
| | | | | Disk011 | 50GB |
| | | | | Disk012 | 50GB |
| | | | | Disk013 | 50GB |
| | | | | Disk014 | 50GB |
| ST2 | AG1 | 200GB | RAID5 4D+1P | Disk001 | 50GB |
| | | | | Disk002 | 50GB |
| | | | | Disk003 | 50GB |
| | | | | Disk004 | 50GB |
| ST2 | | | | Disk005 | 50GB |
| | | | | Disk006 | 50GB |
| | | | | Disk007 | 50GB |
| | | | | Disk008 | 50GB |
| | | | | Disk009 | 50GB |

FIG.8

PAIR MANAGEMENT TABLE 800

| STORAGE APPARATUS ID (801) | VOLUME ID (802) | COPY ROLE (803) | COPY STATUS (804) | PAIR STORAGE APPARATUS ID (805) | PAIR VOLUME ID (806) |
|---|---|---|---|---|---|
| ST1 | VOL001 | ACTIVE | PAIR | ST2 | VOL002 |
| ST2 | VOL002 | STANDBY | PAIR | ST1 | VOL001 |
| ST1 |  |  |  | ST2 |  |

FIG.9

NETWORK I/F MANAGEMENT TABLE 900

| APPARATUS ID | NETWORK I/F ID | MAXIMUM TRANSFER BANDWIDTH | VOLUME ID | PPC SETTING VALUE | REMOTE COPY EXCLUSIVE |
|---|---|---|---|---|---|
| ST1 | Port0 | 2GB bps | VOL001 | 200MB bps | |
| | | | VOL002 | 500MB bps | |
| | Port1 | 2GB bps | VOL001 | | Yes |
| ST2 | Port0 | 2GB bps | VOL002 | | |
| | | | VOL003 | 1.7GB bps | |
| | Port1 | 2GB bps | VOL002 | | Yes |

FIG.10

CACHE MEMORY MANAGEMENT TABLE 1000

| STORAGE APPARATUS ID | CACHE MEMORY ID | CAPACITY | DCR SETTING INFORMATION | |
|---|---|---|---|---|
| | | | VOLUME ID | CAPACITY |
| ST1 | Cash0 | 200GB | VOL002 | 20GB |
| ST2 | Cash0 | 150GB | VOL002 | 100GB |

FIG.11

LUSE MANAGEMENT TABLE 1100

| STORAGE APPARATUS ID | LUSE VOLUME ID | LUSE CONFIGURATION INFORMATION | | |
|---|---|---|---|---|
| | | VOLUME ID | CAPACITY | AG ID |
| ST1 | | | | |
| ST2 | VOL003 | VOL003 | 100GB | AG1 |
| | | VOL002 | 100GB | AG1 |

FIG.21

EXTERNAL CONNECTION CONFIGURATION MANAGEMENT TABLE 2100

| STORAGE CONTROLLER ID (2101) | VOLUME ID (2102) | EXTERNAL CONNECTION STORAGE APPARATUS ID (2103) | REAL VOLUME ID (2104) |
|---|---|---|---|
| SC1 | V-VOL01 | ST1 | VOL001 |
| SC2 | V-VOL02 | ST1 | V-VOL002 |
| SC1 | – | ST1 | – |
| SC3 | – | ST1 | – |

STORAGE SYSTEM AND MANAGEMENT METHOD THEREOF

CROSS REFERENCES

This application relates to and claims priority from Japanese Patent Application No. 2007-194931, filed on Jul. 26, 2007, the entire disclosure of which is incorporated herein by reference.

BACKGROUND

1. Technical Field

The present invention in general relates to a storage system and its management method, and in particular relates to technology for managing the attributes of volumes in each of the plurality of storage apparatuses configuring the storage system.

2. Description of the Related Art

In order to prevent the loss of data due to a failure of a storage apparatus in a computer system, data stored in a certain logical volume in the storage apparatus is normally backed up in a logical volume of physically different storage apparatus configured redundantly. For example, remote copy (or remote mirroring) is known as a type of technology for backing up data. Specifically, remote copy defines a logical volumes (active volume) in an active storage apparatus and a logical volume (standby volume) in a standby storage apparatus as the remote copy pair volumes, and synchronously or asynchronously duplicates data in the active volume to the standby volume to back up data. By way of this, even if a failure occurs in the active storage apparatus, the standby storage apparatus can succeed the I/O access request from the application of the host computer.

With a large-scale computer system, demanded is a "nondisruptive operation" of switching the storage apparatus (or the logical volume therein) without disrupting the execution of applications of the host computer. Thus, even when disrupting the active storage apparatus for reasons other than failure such as for maintenance work, the host computer is required to immediately switch to the standby storage apparatus in a state where the applications are in nondisruptive operation.

In order to achieve this kind of nondisruptive operation, a technology has been proposed for equipping the host computer with an alternate path module and selectively switching the I/O access path to the storage apparatus with a pair relationship defined therein.

For example, Japanese Patent Laid-Open Publication No. 2006-11874 (Patent Document 1) discloses a technique of selectively switching the storage apparatus to which the host computer is trying to I/O access without disrupting the applications. Specifically, Patent Document 1 discloses a volume filter program used for causing a target program (OS, application program, etc.) of the host computer to recognize either one of a copy source volume and a copy destination volume configuring a volume pair. When the volume filter program, for example, detects a situation where the active copy source volume cannot be used due to failure or maintenance work, the volume filter program automatically switches the I/O access path to the standby copy destination volume.

Such an alternate path module can also be applied, by using the virtual volume function, to a storage system that provides the logical volumes (real volumes) in a physical device as virtual volumes in a plurality of storage controllers to the host computer. The virtual volume function allows a system administrator to allocate applications to a virtual volume without having to be aware of the logical volumes in the physical device, thereby reducing workloads of the system administrator.

Japanese Patent Laid-Open Publication No. H10-283272 (Patent Document 2) discloses a technique that the storage server provides a virtual volume to the host computer. Specifically, Patent Document 2 discloses that the storage server detects the volumes in the respective storage systems, manages such volumes as storage areas that have not yet been allocated to itself, and creates a virtual volume in the storage server based on one or more volumes in the foregoing unallocated storage areas so as to allocate a virtual volume to the host computer. In the I/O access from the host computer to the virtual volume, the storage server sequentially converts the virtual volume into an address of the real volume and relays the I/O access.

SUMMARY

When a volume in a storage apparatus is provided to a host computer, the administrator normally pre-sets an attribute (property) for each "volume-related function" of the storage apparatus. As such volume-related function, there are, among others, a band limitation function for limiting the I/O transfer bandwidth to the respective volumes, a capacity expansion function for each volume. Conventionally, even when a pair relationship was defined in volumes of different storage apparatuses, the administrator set the function attribute to the respective volumes of the respective storage apparatuses. Further, when the specification of the respective storage apparatuses is different, the function would also differ in many cases, and the setting of the function attribute became complex.

In addition, other anticipated cases include setting the function only in an active volume and not setting the corresponding function in a standby volume among the volumes defined as a pair relationship, and also cases where the setting of the function attribute in both volumes is different.

Thus, with a computer system capable of selectively switching volumes using the alternate path module as described above, if the setting of the function attribute in the volumes defined in a pair relationship is different, the system performance in the volume after the I/O access path is switched will deteriorate, and, in a worst case scenario, the system will break down and interfere with the operation of the system.

Accordingly, an object of the present invention is to provide a storage system and its management method capable of efficiently setting the volume-related function of volumes defined in a pair relationship.

More specifically, an object of the present invention is to provide a storage system and its management method capable of checking the consistency and validity of the volume-related function set between volumes defined in a pair relationship.

Another object of the present invention is to provide a storage system and its management method capable of normally succeeding the I/O access without deteriorating the system performance even when the I/O access path to the volume is switched with the alternate path program.

The additional objects of the present invention will become clear from the ensuing embodiments.

In order to achieve the foregoing objects, the present invention possesses the following technical features.

Specifically, according to one aspect of the present invention, provided is a storage system comprising a first storage apparatus having at least one volume to be provided to a host computer, a second storage apparatus connected to the first storage apparatus, and having a second volume having a pair relationship with a first volume in the first storage apparatus, and a management apparatus connected to the first storage apparatus and the second storage apparatus and configured to manage the first storage apparatus and the second storage apparatus. The management apparatus includes a user interface for setting an attribute of a function related to at least one volume of the first storage apparatus and an attribute of a function related to at least one volume of the second storage apparatus. Moreover, the management apparatus compares the attribute of a first function related to the first volume and the attribute of a second function related to the second volume, and outputs the result of the comparison to the user interface.

According to another aspect of the present invention, provided is a storage system comprising a first storage apparatus having at least one volume to be provided to a host computer, a second storage apparatus connected to the first storage apparatus, and having a second volume defined in a pair relationship with a first volume in the first storage apparatus, and a management apparatus connected to the first storage apparatus and the second storage apparatus, and for managing the first storage apparatus and the second storage apparatus. The management apparatus includes a user interface for setting an attribute of a function related to at least one volume of the first storage apparatus. Moreover, the management apparatus receives a setting request of an attribute of a function related to the first volume directed to the first storage apparatus via the user interface, determines whether the attribute of the function in the received setting request is applicable to the first storage apparatus, and outputs the result of the determination to the user interface.

According to yet another aspect of the present invention, provided is a storage system comprising a storage apparatus having a real volume formed in a storage medium holding actual data to be handled by an application program in a host computer, a first storage controller connected to the storage apparatus and configured to control the storage apparatus, a second storage controller connected to the storage apparatus and configured to control the storage apparatus, and a management apparatus connected to the storage apparatus and the storage controller and configured to manage the storage apparatus and the storage controller. The first storage controller includes a first virtual volume, which is provided to an application program in the host computer, associated with the real volume. The second storage controller includes a second virtual volume, which is provided to an application program in the host computer, associated with the real volume. The management apparatus includes a user interface for setting an attribute of a function related to at least one volume of the first storage controller and an attribute of a function related to at least one volume of the second storage controller. Moreover, the management apparatus compares the attribute of a first function related to the first virtual volume and the attribute of a second function related to the second virtual volume, and outputs the result of the comparison to the user interface.

According to still another aspect of the present invention, provided is a storage system comprising a storage apparatus having a real volume formed in a storage medium holding a data entity to be handled by an application program in a host computer, a first storage controller connected to the storage apparatus and configured to control the storage apparatus, a second storage controller connected to the storage apparatus and configured to control the storage apparatus, and a management apparatus connected to the storage apparatus and the storage controller and configured to manage the storage apparatus and the storage controller. The first storage controller includes a first virtual volume, which is provided to an application program in the host computer, associated with the real volume. The second storage controller includes a second virtual volume, which is provided to an application program in the host computer, associated with the external volume. The management apparatus receives a setting request of an attribute of a function related to the first virtual volume directed to the first storage controller via the user interface, determines whether the attribute of the function in the received setting request is applicable to the first storage controller, and outputs the result of the determination to the user interface.

According to still another aspect of the present invention, the storage system of this invention can be understood to be an invention of a program and an invention of a method.

According to the present invention, the system administrator will be able to efficiently set the function attribute of volumes defined as a pair relationship in a storage system, and easily confirm the consistency and validity of the function attribute between volumes.

In addition, according to the present invention, the storage system is able to normally succeed the I/O access and continue the storage service without deteriorating the system performance even when the I/O access path is switched by the alternate path program between the volumes defined in a pair relationship.

DESCRIPTION OF DRAWINGS

FIG. 5 is a diagram showing an example of an apparatus management table in the management apparatus according to an embodiment of the present invention;

FIG. 6 is a diagram showing an example of a volume allocation management table in the management apparatus according to an embodiment of the present invention;

FIG. 7 is a diagram showing an example of a storage area configuration management table in the management apparatus according to an embodiment of the present invention;

FIG. 8 is a diagram showing an example of a pair management table in the management apparatus according to an embodiment of the present invention;

FIG. 9 is a diagram showing an example of a network I/F management table in the management apparatus according to an embodiment of the present invention;

FIG. 10 is a diagram showing an example of a cache memory management table in the management apparatus according to an embodiment of the present invention;

FIG. 11 is a diagram showing an example of a LUSE management table in the management apparatus according to an embodiment of the present invention;

FIG. 21 is a diagram showing an example of an external connection configuration management table in the management apparatus according to an embodiment of the present invention;

DETAILED DESCRIPTION

Embodiments of the present invention are now explained with reference to the attached drawings.

First Embodiment

This embodiment explains a storage system that monitors the setting status of function attributes pertaining to the active volumes and the standby volumes in different storage apparatuses defined in a pair relationship.

(1) System Configuration (1-1) Configuration of Computer System

Figure 1:
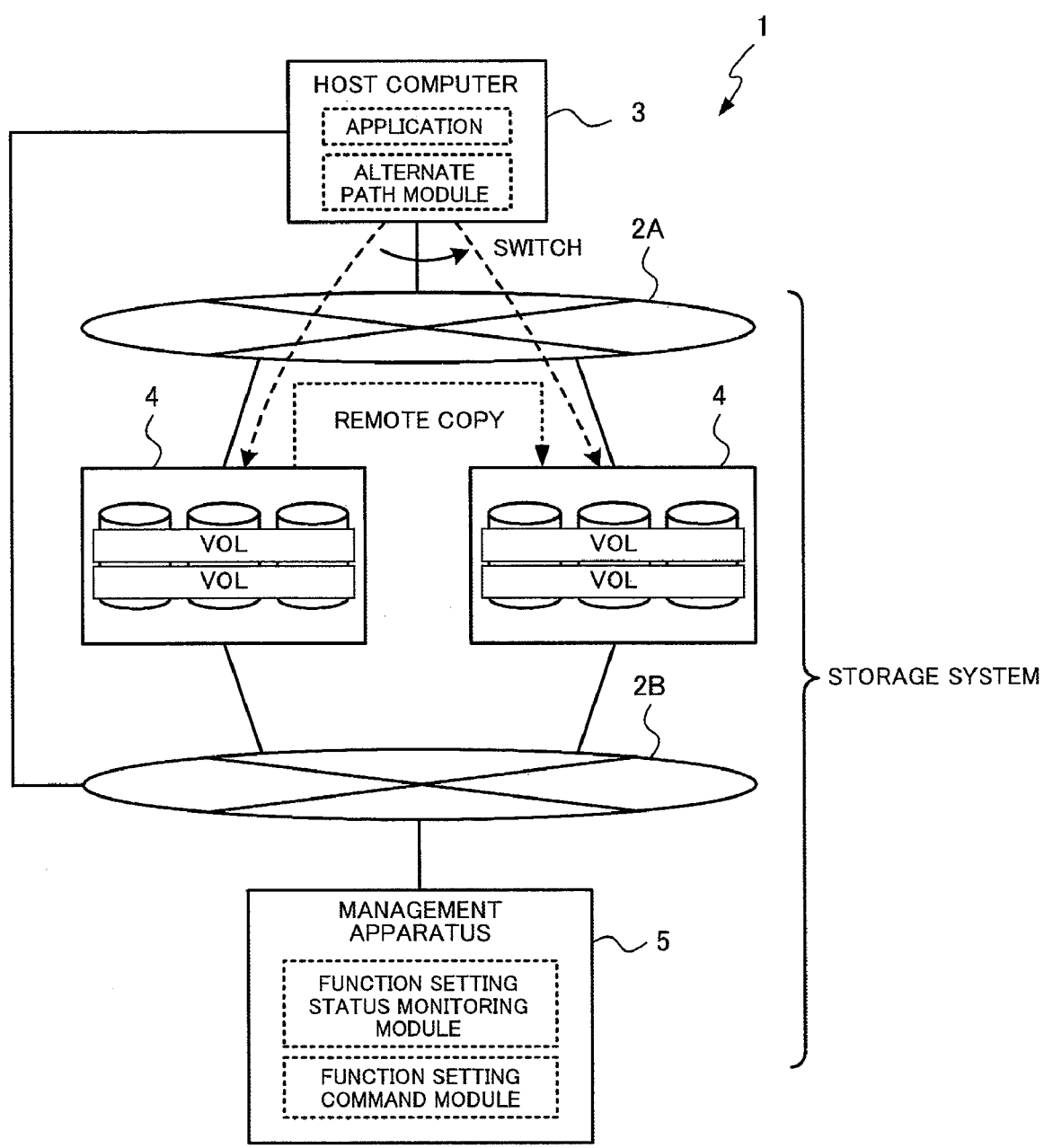
FIG. 1 is a diagram showing the configuration of a computer system according to an embodiment of the present invention.

FIG. 1 is a diagram showing the configuration of a computer system 1 according to an embodiment of the present invention. As shown in FIG. 1, the computer system 1 includes a host computer 3, a plurality of storage apparatuses 4 operatively connected thereto via a storage network 2A, and a management apparatus 5 operatively connected to these components via a management network 2B. The computer system 1, for example, may be configured as a business system of banks or a seat reservation business system of airline companies.

The storage network 2A is primarily a network system to be used for the communication based on an I/O access between the host computer 3 and the storage apparatus 4. The storage network 2A may be, for example, a LAN, Internet or SAN (Storage Area Network), and is typically configured to include a network switch, hub or the like. In this embodiment, the storage network 2A may be configured from a fibre channel protocol-based SAN (FC-SAN).

The management network 2B is a network to be used for the communication upon the management apparatus 5 managing the host computer 3 and the storage apparatus 4. In this embodiment, the management network 2B may be configured from an IP protocol-based LAN. Nevertheless, this does not mean that the storage network 2A and the management network 2B are always configured as individual networks. For example, when the storage network 2A is configured from an IP protocol-based network, this will mean that the two networks are formed in a single network system.

Figure 2:
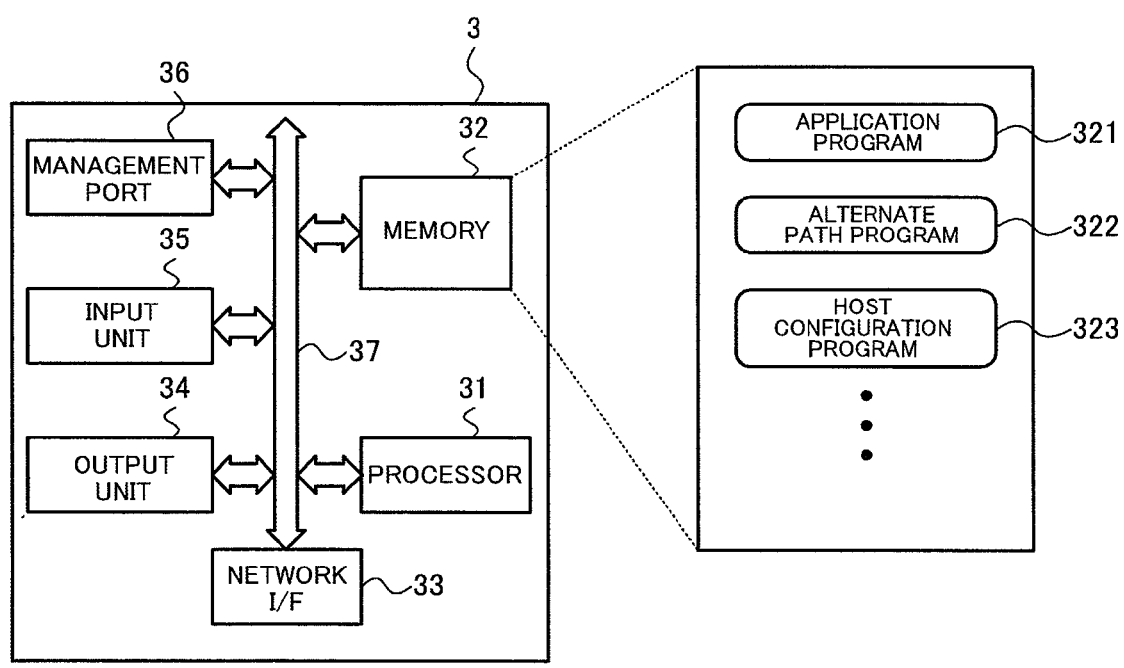
FIG. 2 is a diagram showing the configuration of a host computer in the computer system according to an embodiment of the present invention.

The host computer 3, for example, is a core computer in a business system of banks or a seat reservation business system of airline companies. Specifically, the host computer 3 comprises hardware resources such as a processor, a memory, a communication interface, and a local I/O device, and also comprises software resources such as a device driver, an operating system (OS), and an application program (FIG. 2). Thus, the host computer 3 executes various programs under the control of the processor, and realizes desired processing based on the cooperative effect with the hardware resources. For example, the host computer 3 I/O accesses the logical units or logical volumes (VOL: hereinafter simply referred to as "volumes") in the storage apparatus 4 described in detail later and realizes a desired business system by executing business application programs based on the OS and under the control of the processor.

The host computer 3 of this embodiment comprises an alternate path module, and is configured to selectively switch the I/O access destination of the application program. Such an alternate path module, for example, is implemented with an alternate path program loaded in the host computer 3 and operated as a device driver. The application program in the host computer 3 I/O accesses the volumes in the storage apparatus 4 via the alternate path program positioned at a lower level. An I/O access path is a path used by the application program upon I/O accessing a specific volume, and, in particular, this sometimes refers to the path between the alternate path program and the specific volume. The alternate path program uniquely specifies the I/O access path based on a combination of the identifier of the network interface of the host computer 3 and the identifier of the network interface of the storage apparatus 4, and thereby recognizes the intended volume.

The storage apparatus 4 is an apparatus for providing data storage service to the host computer 3, and includes one or more volumes to be I/O accessed by the host computer 3.

A volume is a "logical storage" that can be recognized by an application program in the host computer 3. A volume is formed in one or more physical devices as the physical storage medium holding data. In a typical implementation, a volume is formed on a physical device via an intermediate logical device. Specifically, in view of increasing the capacity and reliability, RAID (Redundant Arrays of Independence Disks) technology may be used to define a virtual device as a RAID group or an array group based on several physical devices. Then, one or more logical devices are associated with the virtual device, and logical volumes are associated with each of such logical devices. For the purpose of facilitating the understanding of the present invention, the following explanation will be based on the assumption that the intermediate logical device is omitted and the logical volume is formed on the physical device.

A logical volume identifier is associated with the volumes, and, therefore, the host computer 3 recognizes a specific volume by using the logical volume identifier. The logical volume identifier is identification information for identifying the logical device (in other words, the volume) to be managed for each controller 43 as described later.

In this embodiment, a storage apparatus 4 in an active mode (active storage apparatus 4A) and a storage apparatus 4 in a standby mode (standby storage apparatus 4B) are provided, and these apparatuses respectively provide an active volume and a standby volume to the host computer 3.

The storage apparatus 4 comprises a remote copy (or mirroring) function for performing backup of data.

The remote copy function duplicates data (volumes) synchronously or asynchronously between the volumes (remote copy pair volumes) defined as a pair relationship. The remote copy function, for example, is implemented with a remote copy program loaded in the storage apparatus 4. In synchronous remote copy, the active storage apparatus 4A that received a write request from the host computer 3 writes data in its own volume according to the foregoing write request, requests the writing of data into the volume of the standby storage apparatus 4B in a pair relationship, and then notifies the host computer 3 of the completion of I/O access at the point in time the writing of data into the standby storage apparatus 4B is complete. In contrast, in asynchronous remote copy, copy is performed between the remote copy pair volumes independently (asynchronously) with the write request from the host computer 3. When a volume is defined as a new pair relationship in the standby storage apparatus 4 with the volume in the currently-operated active storage apparatus 4, data is transferred from the active volume to the newly defined standby volume by operation of an initial copy.

The computer system 1 of this embodiment realizes the data storage service of nondisruptive operation by way of duplicating data (volumes) in different storage apparatuses 4 using a remote copy function, and implementing the alternate path program in the occurrence of a failure or maintenance work.

Specifically, the active storage apparatus 4A transfers data (e.g., data according to a write request) in the active volume to the standby volume in the storage apparatus 4B via the storage network 2A by using the remote copy function of the storage apparatus 4A. Here, the alternate path programs in the host computer 4 set the I/O access path to enable the recognition of the active volume and the standby volume defined in a pair relationship. If the active volume can not be used due to the occurrence of a failure or maintenance work in the active storage apparatus 4A, the alternate path program in the host computer 3 selects the I/O access path to the standby volume in substitute for the I/O access path to the active volume in order to continue the data storage service.

In general, there may be two techniques of making the host computer 3 recognize the active volume and the standby volume as the identical volume. The first technique is for the alternate path program to treat the active volume and the standby volume as the same volume. This is accomplished in a manner that the alternate path program in the host computer 3 retains the same identification information associated with identification information for each identifying the active volume and the standby volume. The second technique is where the storage apparatus 4 allows the alternate path program to recognize the active volume and the standby volume as the same volume. This is accomplished in a manner that the storage apparatus 4 actually providing the volume dynamically allocating identification information of the volume retained by the alternate path program to its own volume.

In addition to the remote copy function, the storage apparatus 4 comprises various functions (e.g., a volume creation function, a band limiting function, a cache residency function, volume expansion function). These functions are validated/invalidated in accordance with the setting of their function attributes. Such functions may be implemented in the storage apparatus 4 depending on its specification.

The volume creation function is a function for creating a volume in the physical device of the disk drive 41, and deleting the existing volumes. The volume creation function may include creating and deleting an array group formed based on the disk drive 41.

The band limiting function is a function for controlling the maximum bandwidth of the network I/F 44, and thus is used to set the maximum bandwidth for each port of the network I/F 44. As a result of setting the maximum bandwidth for each port, it is possible to control the I/O traffic to the one or more volumes allocated to the port. In this specification, this function is referred to as the "PPCT (Prioritized Port Control) function."

The cache residency function is a function for allowing the overall volume to be provided to the host computer 3 to reside in the cache memory 45, and cancelling the status of such residency. In this specification, this function is referred to as the "DCR (Dynamic Cache Residency) function."

The volume expansion function is a function for combining the volumes in the same storage apparatus 4, and expanding the capacity of the volumes to be provided to the host computer 3. In this specification, this function is referred to as the LUSE (LU Size Expansion) function.

(1-2) Configuration of Host Computer

FIG. 2 is a diagram showing the configuration of the host computer 3 in the computer system 1 according to an embodiment of the present invention.

As shown in FIG. 2, the host computer 3 comprises a processor 31, a memory 32 that functions as a main memory of the processor 31, a network interface (I/F) 33 for connecting to the storage apparatus 4 via the storage network 2A, an output unit 34 such as a display, an input unit 35 such as a keyboard and a mouse, and a management port 36 for connecting to the management network 2B, and these components are interconnected via an internal bus 37.

The processor 31 governs the operational control of the host computer 3, and allows the host computer 3 to realize prescribed processing or functions by executing the various programs stored in the memory 32, cooperating with other hardware resources.

The memory 32, for example, is configured from a RAM and/or a ROM, and stores various programs and data to be used by the processor 31. The various programs are arbitrarily loaded into the memory in part or in whole from an auxiliary storage apparatus not shown. FIG. 2 representatively shows an application program 321, an alternate path program 322, and a host configuration program 323.

The application program 321 is a program for allows the host computer 3 to realize desired operations under the control of the processor 31.

The alternate path program 322 is a program for selecting the I/O access path to the volume to which the application program 321 is attempting to I/O access. The alternate path program 322 is located at a lower level than the application program 321, and selects one I/O access path by receiving the I/O access request issued by the application program 321.

The host configuration program 322 is a program for managing the system configuration information in the host computer 3. Further, the host configuration program 322 sends system configuration information by communicating with the management apparatus 5 connected via the management port 36.

(1-3) Configuration of Storage Apparatus 4

Figure 3:
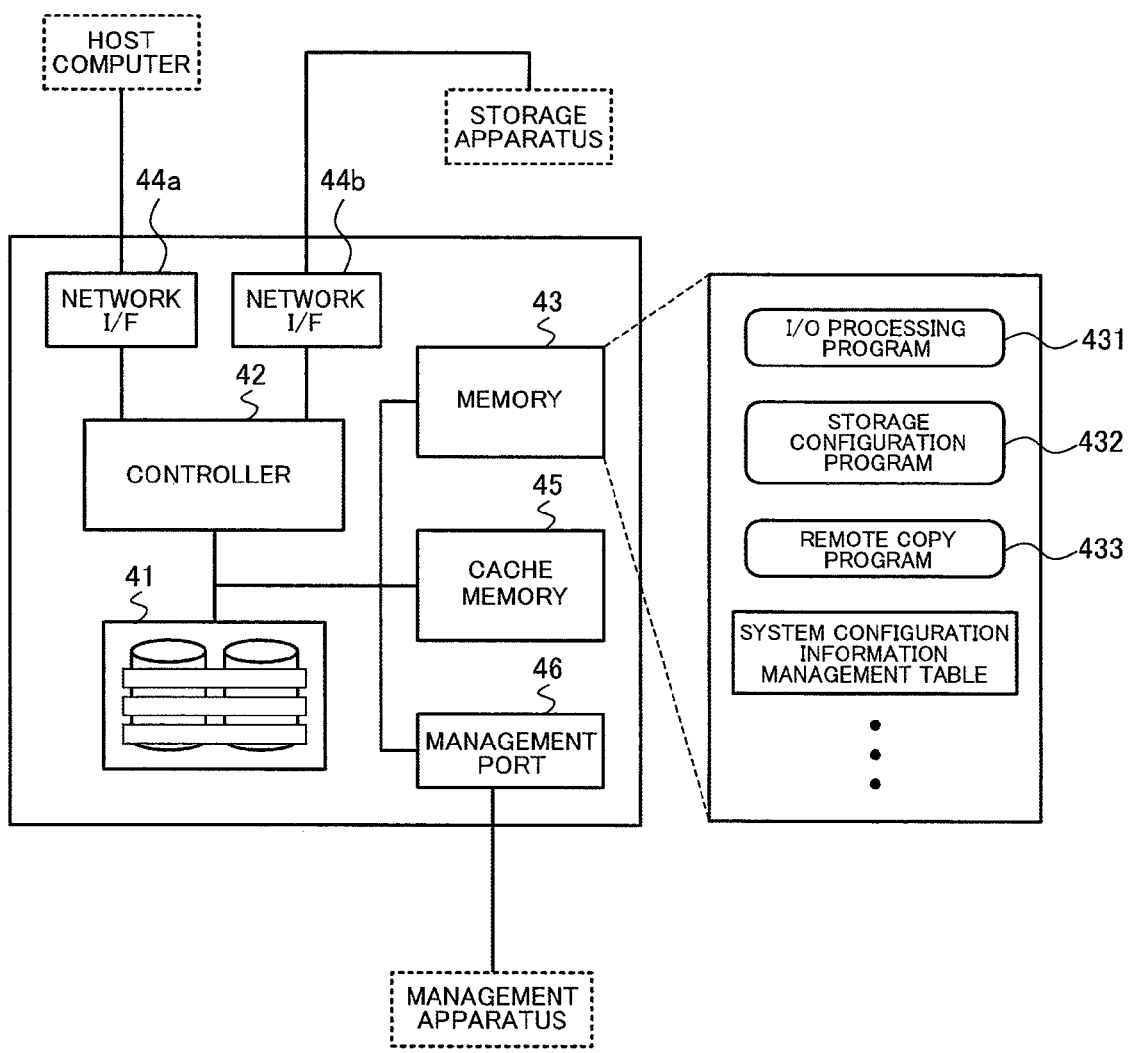
FIG. 3 is a diagram showing the configuration of a storage apparatus in the computer system according to an embodiment of the present invention.

FIG. 3 is a diagram showing the configuration of the storage apparatus 4 in the computer system 1 according to an embodiment of the present invention. The basic configuration of the storage apparatus 4 is the same for both active and standby storage apparatuses, and the following explanation will be regarding the active storage apparatus 4A.

As shown in FIG. 3, the storage apparatus 4 comprises a disk drive 41 including a physical device, a controller 42 for performing the core processing of the data storage service, a memory 44 that serves as a main memory of the processor not shown in the controller 42, one or more network interfaces (I/F) 42 for connecting to the storage network 2A, a cache memory 45 for caching the application data associated with the I/O access, and a management port 46 for connecting to the management network 2B, and these components are interconnected via an internal bus around the controller 42.

The disk drive 41 is configured by including storage mediums such as a plurality of hard disk drives or nonvolatile memories as physical devices. In the disk drive 41, as described above, a logical device is formed in the RAID group (array group) as the virtual device formed with RAID technology, and a logical volume is further allocated thereto. In FIG. 3, the virtual device and the logical device as the intermediate logical devices are omitted.

The controller 42 is a core component that performs data storage processing for the host computer 3 by executing the I/O processing program stored in the memory 43 under the control of the processor (not shown). The controller 42, for example, fetches and interprets a command that was received by the network I/F 44 and stored into the memory 44 according to the I/O processing program, and, if such a command is interpreted as a write command, the controller stores the corresponding data temporarily stored in the cache memory 45 into a prescribed storage area (block) of the disk drive 42.

The memory 44 is configured from, for example, a RAM and/or a ROM, and stores various programs and data to be used by the processor of the controller 42. For instance, the memory 44 stores commands (I/O commands) concerning the I/O access request and control information for controlling the storage apparatus 4 received from the host computer 3 via the network I/F 42. The various programs are arbitrarily loaded into the memory in part or in whole from an auxiliary storage apparatus not shown. FIG. 3 representatively shows an I/O processing program 431, a storage configuration program 432, and a remote copy program 433.

The I/O processing program 431 is a program for achieving the data storage service to the host computer 3, and performs processing according to the I/O access request such as a write request or a read request from the host computer 3.

The storage configuration program 432 is a program for managing the configuration of the storage apparatus 4. Specifically, the storage configuration program 432 is used to validate or invalidate various functions such as a volume creation function, a PPC function (i.e., band limiting function), a DCR function (i.e., cache residency function), an LUSE function (i.e., volume expansion function), and a remote copy function in the storage apparatus 4. The storage configuration program 432 executes the setting of the function attributes for validating or invalidating the various functions according to function setting command sent from the management apparatus 5. The storage configuration program 431 also sends configuration information such as the function attributes of the storage apparatus 4 to the management apparatus 5.

The network I/F 44 is equipped with a port (not shown), and is a circuit board that functions as a communication interface for communicating with the other apparatuses connected to the port via the storage network 2A. The storage apparatus 4 of this embodiment includes a network I/F 44a for connecting to the host computer 3, and a network I/F 44b for connecting to the other party's storage apparatus 4 (i.e., the standby storage apparatus 4B) in a pair relationship. When the network I/F 44 receives an I/O access command such as a write command or a read command from the storage network 2A, it writes this command in the memory under the control of the controller 42. In addition, under the control of the controller 42, the network I/F 42 outputs the application data read from the disk drive 41 and cached in the cache memory 45 to the storage network 2A for sending such application data to the apparatus requesting data (for instance, the host computer 3).

The cache memory 45 temporarily stores data to be exchanged between the host computer 3 and the disk drive 41 for enhancing system performance to the host computer 3. Specifically, the cache memory 45 temporarily stores data associated with the write command received from the host computer 3 and the data read from the disk drive 41 according to the read command.

The management port 46 is a communication port for connecting to the management apparatus 5 via the management network 2B. The management port 46, for instance, is realized as an Ethernet (registered trademark) device.

(1-4) Configuration of Management Apparatus

Figure 4:
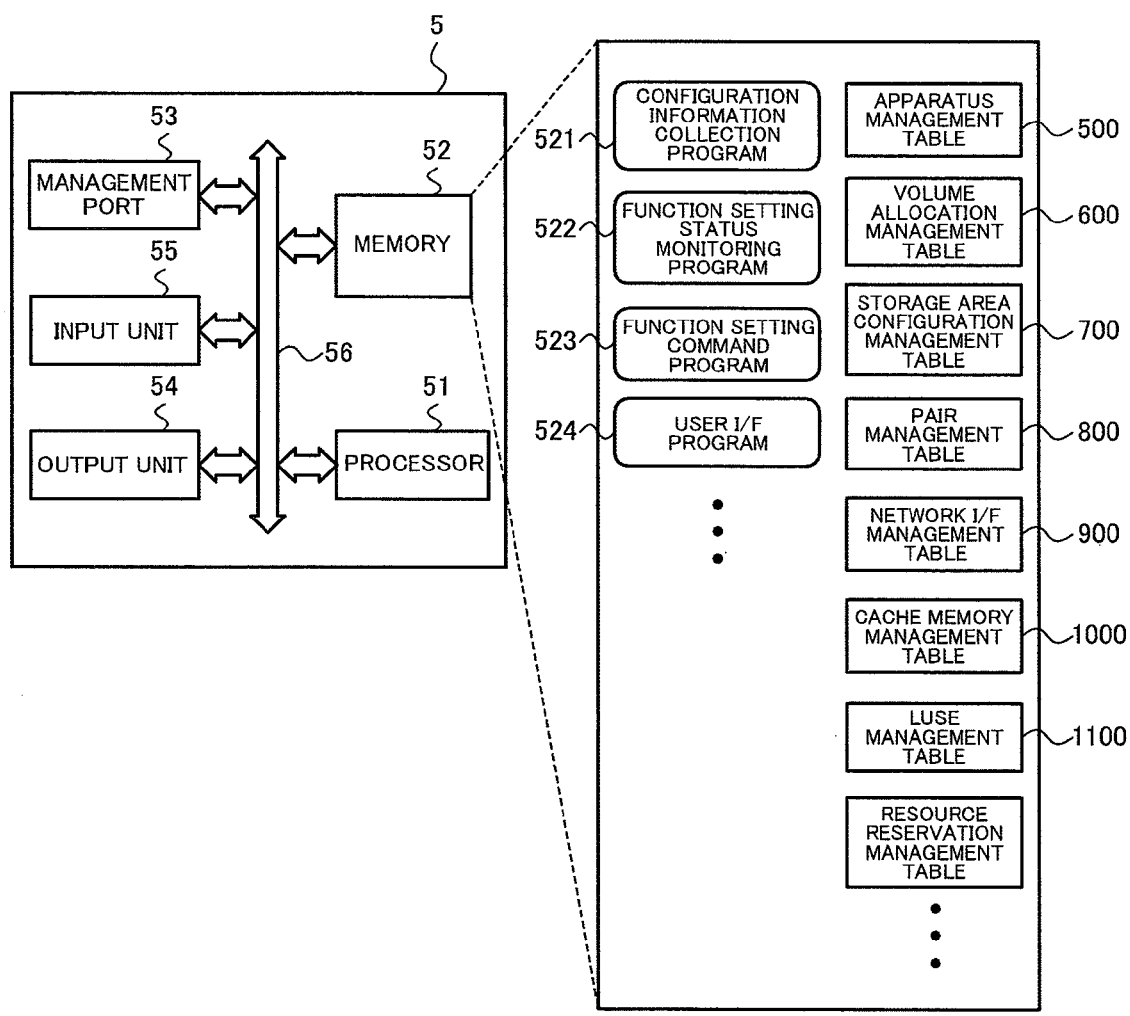
FIG. 4 is a diagram showing the configuration of a management apparatus in the computer system according to an embodiment of the present invention.

FIG. 4 is a diagram showing the configuration of the management apparatus 5 in the computer system 1 according to an embodiment of the present invention. The management apparatus 5 may be configured, for example, from a general-purpose computer, and realizes the desired processing by executing various management programs in the operating system.

Referring to FIG. 4, the management apparatus 5 comprises a processor 51, a memory 52 that serves as a main memory of the processor 51, a management port 53 for connecting to the management network 2B, an output unit 54 such as a display device for outputting the processing results, and an input unit 55 such as a keyboard and a mouse, and these components are interconnected via an internal bus 56.

The memory 52 stores, as the management programs of the storage system, a configuration information collection program 521, a function setting status monitoring program 522, a function setting command program 523, and a user interface program 524. The various programs are arbitrarily loaded into the memory 52 for use by the processor 51 in part or in whole from an auxiliary storage apparatus not shown.

The memory 52 also stores various management tables to be referred to by these management programs. In this embodiment, stored are an apparatus management table 500, a volume allocation management table 600, a storage area configuration management table 700, a pair management table 800, a network I/F management table 900, a cache memory management table 1000, and a LUSE management table 1100.

The function setting status monitoring program 522 is a program for monitoring the setting status of function attributes of the volume-related functions in the storage apparatus 4. Specifically, the function configuration status monitoring program 522 warns the system administrator when an inconsistent function attribute is being set between the storage apparatuses 4 having the remote copy pair volumes.

The function configuration status monitoring program 522 also provides a setting status of function attributes for each function to the system administrator via the user interface.

The function setting command program 523 is a program for commanding the function setting to the storage apparatus 4 only when there is consistency in the function attribute to be set between the storage apparatuses 4 having the remote copy pair volumes. When there is no consistency in the function attribute tentatively set between the storage apparatuses 4 having the remote copy pair volumes, the function setting command program 523 restores the function attribute to a state before the tentative setting, and warns the system administrator.

The configuration information collection program 521 is a program for collecting the configuration information from the storage apparatus 4 via the management network 2B. The configuration information collection program 521 updates the fields in the various management tables described later based on the configuration information collected from the storage apparatus 4.

The user interface program 524 is a program for providing a user interface to the system administrator for managing the host computer 3 and the storage apparatus 4. The user interface program 524 receives the setting of the function attribute from the system administrator operating the input unit 55, and delivers this as a function setting request to the function setting status monitoring program 522 or the function setting command program 523. The user interface program 524 receives the execution result of these programs and outputs such result to the output unit 54.

(2) Configuration of Various Management Tables (2-1) Apparatus Management Table 500

FIG. 5 is a diagram showing an example of the apparatus management table 500 in the management apparatus 5 according to an embodiment of the present invention. The apparatus management table 500 is a table for specifying the apparatuses such as the host computer 4 and the storage apparatus 4 to be managed by the management apparatus 5. The apparatus management table 500 also manages the storage apparatus 4 to be managed regarding which function it comprises.

As shown in FIG. 5, the apparatus management table 500 is configured from an apparatus ID field 501 for registering apparatus IDs to be used by the management apparatus 5 to uniquely identify apparatuses such as the host computer 3 and the storage apparatus 4, a type field 502 for registering the type of apparatus, an apparatus information field 503 for registering other information to be used for identifying apparatuses such as the vendor name, model name, serial number, and host name, an IP address field 504 for registering IP addresses of the management ports to be connected to the apparatuses, and a function ID field 505 for registering the functions that can be provided by the storage apparatus 4.

Regarding the functions registered in the function ID field 505, regardless of whether the storage apparatus 4 has validated such functions, all providable functions are registered depending on the specification of the storage apparatus 4. This example shows that the storage apparatuses ST1 and ST2 comprise the PPC function, the DCR function, and the LUSE function depending on their specification.

The apparatus management table 500, for example, is created by the system administrator operating the user interface of the management apparatus 5. Alternatively, the apparatus management table may be configured to be automatically created using a name service or the like in the storage network 2A or the management network 2B.

(2-2) Volume Allocation Management Table

FIG. 6 is a diagram showing an example of the volume allocation management table 600 in the management apparatus 5 according to an embodiment of the present invention. The volume allocation management table 600 is a table for managing the allocation status of volumes in the storage apparatus 4. The volume allocation management table 600 is created and updated by the management apparatus 5 executing the configuration information collection program 521.

As shown in FIG. 6, the volume allocation management table 600 is configured from a storage ID field 601 for registering identifiers for uniquely identifying the storage apparatus 4, a volume ID field 602 for registering identifiers for uniquely identifying the volume in the storage apparatus 4, a capacity field 603 for registering the logical storage capacity allocated to the volume, an AGID field 604 for registering identifiers for uniquely identifying the array group (AG) configuring the volumes in the storage apparatus 4, an allocation destination field 605 for registering identifiers for specifying the allocation destination of volumes in the management apparatus 5, an application program (AP) field 606 for registering identifiers for uniquely identifying the application programs using the volumes, and a logical drive ID field 607 for registering logical drive IDs in the host computer 3 configured from the volumes.

When the LUSE function is validated for the volumes of the storage apparatus 4, the primary volumes configuring the LUSE volume are registered in the volume allocation management table 600. Together with the volume ID of the primary volume, "(LUSE)" is registered in the volume ID field 602.

(2-3) Storage Area Configuration Management Table 700

FIG. 7 is a diagram showing an example of the storage area configuration management table 700 in the management apparatus 5 according to an embodiment of the present invention. The storage area configuration management table 700 is a table for managing the configuration of the volume or array group. The storage area configuration management table 700 is created and updated by the management apparatus 5 executing the configuration information collection program.

As shown in FIG. 7, the storage area configuration management table 700 is configured from a storage ID field 701, an AGID field 702, a logical storage capacity field 703 for registering the logical storage capacity of the array group, a RAID level field 704 for registering the RAID configuration of the array group, a disk ID field 705 for registering identifiers for uniquely identifying the disk drives configuring the array group in the storage apparatus 4, and a physical storage capacity field 706 for registering the physical storage capacity of the disk drive.

The disk drives that are not configuring the array group are complied for each storage apparatus 4. In this case, the AGID field 702, the logical storage capacity field 703, and the RAID level field 704 will be null.

(2-4) Pair Management Table 800

FIG. 8 is a diagram showing an example of the pair management table 800 in the management apparatus 5 according to an embodiment of the present invention. The pair management table 800 is a table for managing the combination of the active volume and standby volume in the computer system and the combination of the storage apparatuses 4 capable of forming a pair. The pair management table 800 is created and updated by the management apparatus 5 executing the configuration information collection program.

As shown in FIG. 8, the pair management table 800 is configured from a storage ID field 801 for registering identifiers for uniquely identifying the storage apparatus 4 having volumes having a pair relationship in the management apparatus 5, a volume ID field 802 for registering identifiers for uniquely identifying the volume having a pair relationship in the storage apparatus 4, a copy role field 803 for registering the current "role" regarding whether the volume is an active volume or a standby volume, a copy status field 804 for registering the remote copy status, a pair storage apparatus ID field 805 for registering identifiers for uniquely identifying the storage apparatus 4 (pair storage apparatus) having a volume (remote copy pair volume) forming a pair with the foregoing volume, and the remote copy pair volume ID field 806 for registering identifiers for uniquely identifying the remote copy pair volumes in the pair storage apparatus.

When the fields other than the storage apparatus ID field 805 and the pair storage apparatus ID field 806 are null, this shows that the storage apparatus 4 registered in the storage apparatus ID field 801 and the pair storage apparatus ID field 805 is able to define its volumes as a pair relationship.

(2-4) Network I/F Management Table 900

FIG. 9 is a diagram showing an example of the network I/F management table 900 in the management apparatus 5 according to an embodiment of the present invention. The network I/F management table 900 is a table for managing the configuration of the network I/F 42 of the storage apparatus 4 and the setting status of the PPC function. The network I/F management table 900 is created and updated by the management apparatus 5 executing the configuration information collection program 521.

As shown in FIG. 9, the network I/F management table 900 is configured from a storage apparatus ID field 901, a network I/F ID field 902 for registering identifiers for uniquely identifying the network I/F 42 of the storage apparatus 4, a maximum transfer bandwidth field 903 for registering the maximum bandwidth of the network I/F 42, a volume ID field 904 for registering identifiers for uniquely identifying volumes allocated to the network I/F 42 in the storage apparatus 4, a PPC set value field 905 for registering the set value of the PPC to the volume, and a remote copy exclusive field 906 for registering whether the network I/F 42 is being used exclusively for remote copy.

"N/A" is registered in the PPC set value field 905 when the storage apparatus 4 does not comprise a PPC function, and is null when the PPC itself is not set. "YES" is registered in the remote copy exclusive field 906 when the network I/F 42 is being used exclusively for remote copy, and is null when it is not.

(2-5) Cache Memory Management Table 1000

FIG. 10 is a diagram showing an example of the cache memory management table 1000 in the management apparatus 5 according to an embodiment of the present invention. The cache memory management table 1000 is a table for managing the configuration of the cache memory 45 of the storage apparatus 4 and the setting status of DCR. The cache memory management table 1000 is created and updated by the management apparatus 5 executing the configuration information collection program 521.

As shown in FIG. 10, the cache memory management table 1000 is configured from a storage apparatus ID field 1001, a cache memory ID field 1002 for registering identifiers for uniquely identifying the cache memory 45 of the storage apparatus 4 in the storage apparatus 4, a capacity field 1003 for registering the capacity of the cache memory, and a DCR setting information field 1004 for registering the setting status of DCR of the cache memory. The DCR setting information field 1004 includes a volume ID field 10041 for registering identifiers for uniquely identifying the volume residing in the cache memory in the storage apparatus 4, and a volume capacity field [10042] for registering the capacity of the volume.

"N/A" is registered in the respective sub fields if the storage apparatus 4 does not comprise a DCR function, and the respective sub fields become null when DCR is not set.

(2-6) LUSE Management Table 1000

FIG. 11 is a diagram showing an example of the LUSE management table 1000 in the management apparatus 5 according to an embodiment of the present invention. The LUSE management table 1000 is a table for managing the setting status of the LUSE function in the storage apparatus 4. The LUSE management table is created and updated by the management apparatus 5 executing the configuration information collection program.

As shown in FIG. 11, the LUSE management table 1100 is configured from a storage apparatus ID field 1101, a LUSE volume ID field 1102 for registering identifiers for uniquely identifying the LUSE volume of the storage apparatus 4 in the storage apparatus 4, and a LUSE configuration information field 1103 for registering the configuration information of the LUSE volume. The LUSE configuration information field 1103 is configured from a volume ID field 11031 for registering identifiers for uniquely identifying the volume configuring the LUSE volume in the storage apparatus 4, a capacity field 11032 for registering the logical storage capacity of the volume, and an AGID field 11033 for registering identifiers for uniquely identifying the array group configuring the volume in the storage apparatus 4.

"N/A" is registered in the LUSE volume ID field 1102 and the LUSE configuration information field 1103 if the storage apparatus 4 does not comprise a LUSE function, and these fields become null when LUSE is not set.

(3) Explanation of Programs (3-1) Configuration Information Collection Program 521

The configuration information collection program 521 is a program for collecting configuration information from the storage apparatus 4 and the host computer 3 to be managed by the management apparatus 5. The configuration information collection program 521 is periodically executed under the control of the processor of the management apparatus 5. Alternatively, the configuration information collection program 521 may also be executed based on an execution command from the system administrator, or according to a call from another program in the management apparatus 5.

Specifically, the configuration information collection program 521 refers to the apparatus management table 500, and issues a configuration information request to all storage apparatuses 4 and the host computer 3 registered in the apparatus ID field 501 using the IP addresses of the IP address field 504. The storage apparatus 4 that received the configuration information request collects its own configuration information by executing the storage configuration program, and sends such configuration information to the management apparatus 5. Likewise, the host computer 3 that received the configuration information request collects its own configuration information, and sends such configuration information to the management apparatus 5. The configuration information collection program 521 updates the corresponding fields of various management tables including the volume allocation management table 600, the storage area configuration management table 700, the pair management table 800, the network I/F management table 900, the cache memory management table 1000, and the LUSE management table 1100 based on the configuration information sent from the respective apparatuses to be managed by the management apparatus 5.

(3-2) Explanation of Operation of Function Configuration Status Monitoring Program 522

Figure 12:
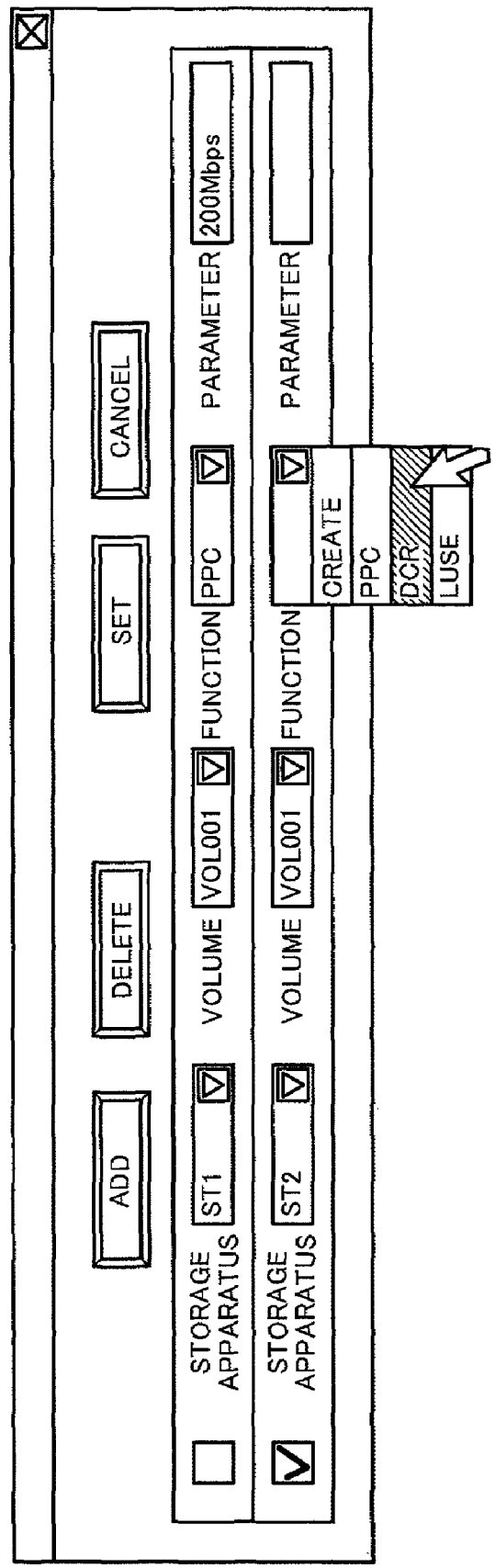
FIG. 12 is a diagram showing an example of a user interface concerning the function attribute setting in the management apparatus according to an embodiment of the present invention.

The function setting status monitoring program 522 is a program for comparing the function attributes set between different storage apparatuses 4 having the remote copy pair volumes defined by the remote copy function of the storage apparatus 4, and, upon determining that the set function attribute is different, notifying the different contents to the system administrator. The function setting command program 523, for example, is executed by a setting request of the function attribute being input from the system administrator via a user interface as shown in FIG. 12. In this specification, the setting and cancellation of attributes regarding the volume-related functions are simply referred to as the setting of function attributes or function setting.

Figure 13:
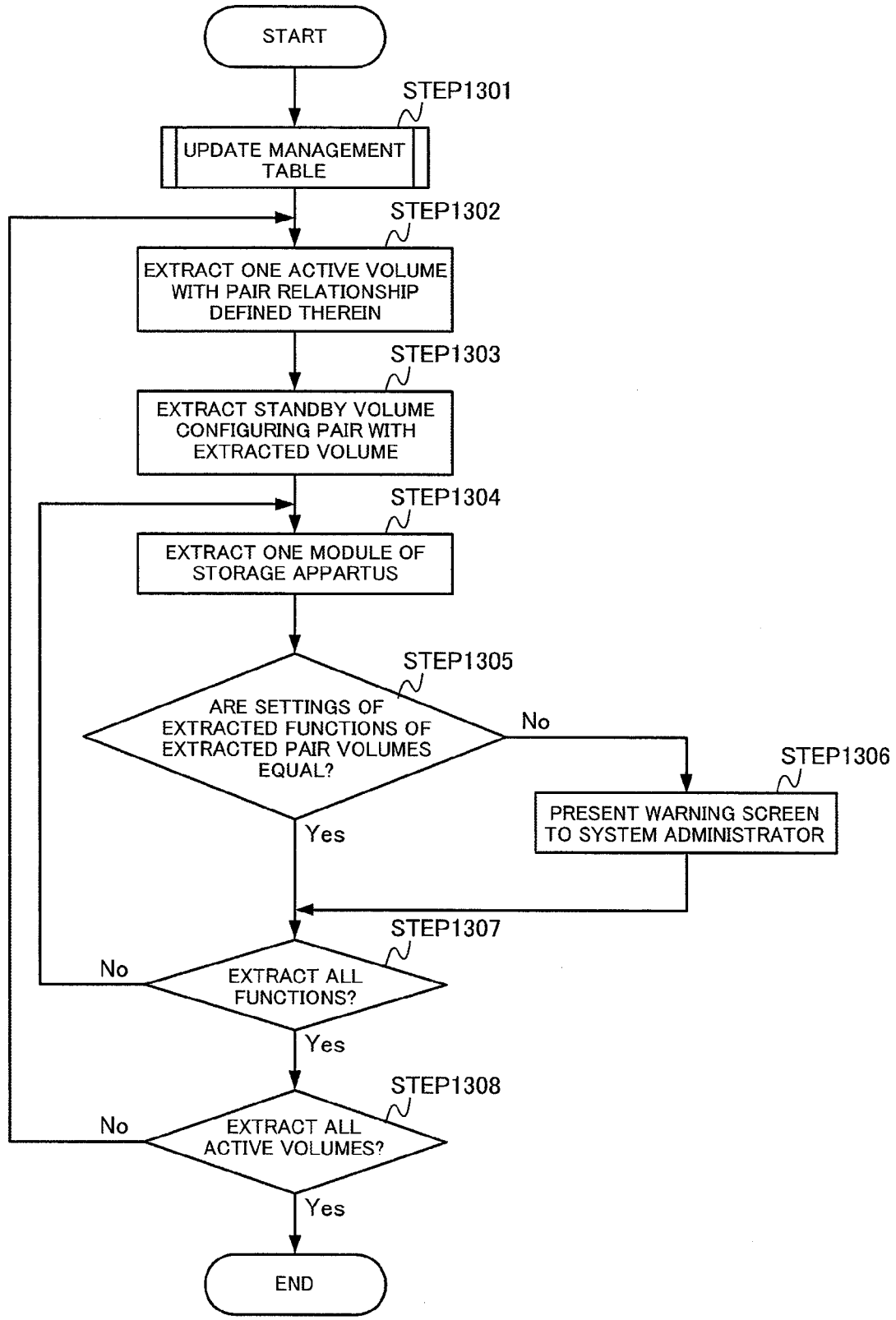
FIG. 13 is a flowchart explaining the operation of a function setting status monitoring program in the management apparatus according to an embodiment of the present invention.

FIG. 13 is a flowchart explaining the operation of the function setting status monitoring program 522 in the management apparatus 5 according to an embodiment of the present invention. The function setting status monitoring program 522 is executed periodically by the management apparatus 5, or executed based on a command from the system administrator.

Referring to FIG. 13, when the function setting status monitoring program 522 is executed, it foremost calls the configuration information collection program, and thereby updates the various management tables including the volume allocation management table 600, the storage area configuration management table 700, the pair management table 800, the network I/F management table 900, the cache memory management table 1000, and the LUSE management table 1100 to the latest contents (STEP 1301).

The function setting status monitoring program 522 subsequently refers to the pair management table 800, extracts one active volume among the active volumes defined in a pair relationship (STEP 1302), and selects the remote copy pair volume of the extracted active volume as the standby volume (STEP 1303).

Specifically, the function setting status monitoring program 522 extracts the volumes registered in the volume ID field 802 in which the copy role field 803 of the pair management table 800 is "ACTIVE" as the active volumes, and extracts the volumes registered in the remote copy pair volume ID field 806 as the standby volumes. For example, if according to the pair management table 800 shown in FIG. 8, the function setting status monitoring program 522 extracts the volume "VOL001" as an active volume, and extracts the volume "VOL002" as a standby volume. In this case, the function setting status monitoring program 522 may also refer to the volume allocation management table 600, and extract the volumes used by the same application program and allocated to the same logical drive as active volumes and standby volumes, respectively. By way of this, the remote copy pair volumes having an I/O access path that can be selectively switched based on the same path alternating program in the host computer 3 will be extracted.

Subsequently, the function setting status monitoring program 522 refers to the apparatus management table 500, and extracts one function of the storage apparatus having the extracted active volume from the function ID field 505 (STEP 1304).

The function setting status monitoring program 522 thereafter determines whether the setting of the extracted function attributes is equal regarding the extracted active volume and standby volume (STEP 1305).

Figure 14:
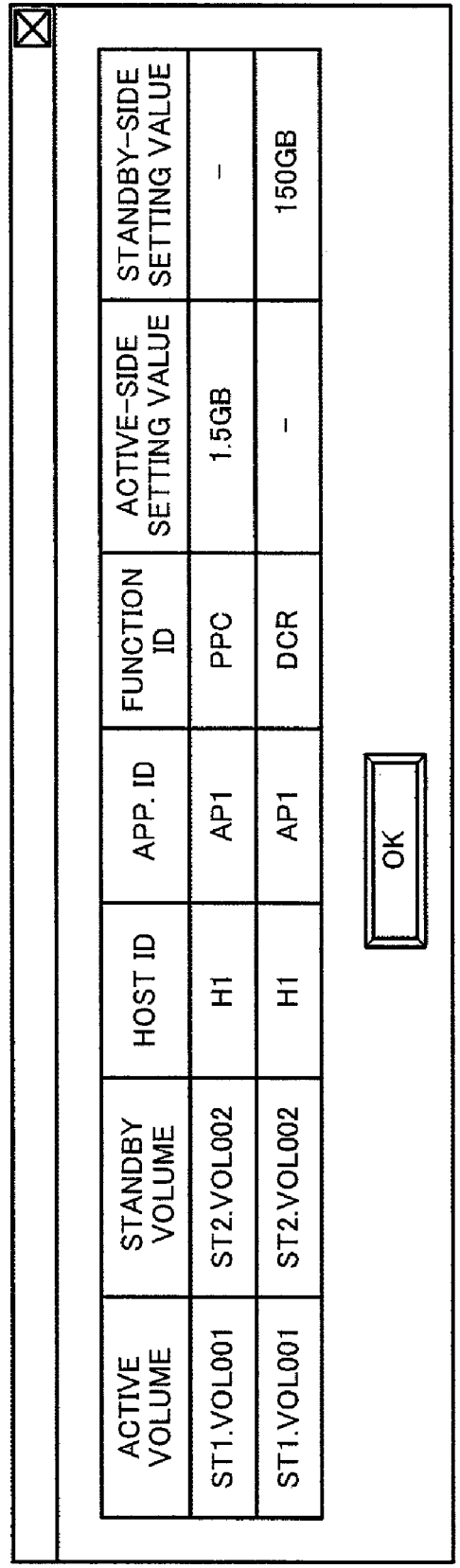
FIG. 14 is a diagram showing an example of a warning screen presented by the function setting status monitoring program in the management apparatus according to an embodiment of the present invention.

When the function setting status monitoring program 522 determines that the setting of the extracted function attributes is not equal, as shown in FIG. 14, it presents to the system administrator a warning screen showing that the settings of the function attributes regarding the active volume and standby volume are different (STEP 1306).

Subsequently, the function setting status monitoring program 522 determines whether all functions of the storage apparatus 5 have been extracted (STEP 1307), and, when there is a function that has not yet been extracted (STEP 1307; No), it returns to the processing at STEP 1304. Further, when the function setting status monitoring program 522 determines that all functions have been extracted (STEP 1307; Yes), it further determines whether all active volumes have been extracted (STEP 1308). If there is an active volume that has not yet been extracted (STEP 1308; No), the function setting status monitoring program 522 returns to the processing at STEP 1302. When the function setting status monitoring program 522 determines that all active volumes have been extracted (STEP 1308; Yes), it ends the function setting status monitoring processing.

(4) Operational Examples

Operational examples of the management apparatus 5 to execute the function setting status monitoring program 522 based on various management tables having the foregoing contents are now explained.

After updating the various management tables, the management apparatus 5 refers to the pair management table 800 and selects the volume identified with volume ID "VOL001" of the storage apparatus 4 identified with storage apparatus ID "ST1" as an active volume. The volume of the storage apparatus 4 is represented as a combination "ST1. VOL001" of the storage apparatus ID and the volume ID. The management apparatus 5 thereafter extracts "ST2. VOL002" as the standby volume. The management apparatus 5 additionally extracts "PPC" as the function of the storage apparatus 4 from the function ID field 505 of apparatus ID "ST1" in the apparatus management table 500.

In this case, the management apparatus 5 refers to the PPC set value field 905 of the storage network I/F management table 900 and compares the PPC set values of "ST1. VOL001" and "ST2. VOL002." Specifically, the PPC set value of "ST1. VOL001" is 200 MBbps, and the PPC set value of "ST2. VOL002" is null. Thus, the management apparatus 5 warns the system administrator that the PPC set values of "ST1. VOL001" and "ST2. VOL002" are different.

The management apparatus 5 sets the function ID "PPC" in the apparatus management table 500 as "processed," and extracts the function ID "DCR" as the subsequent function of the storage apparatus 4.

In this case, the management apparatus 5 refers to the capacity field 10042 of the cache memory management table 1000, and compares the DCR setting status of "ST1. VOL001" and "ST2. VOL002." In other words, since "ST1. VOL001" has no DCR setting information, and the DCR setting information of "ST2. VOL002" is set to have a capacity of "500 MBbps," the management apparatus 5 warns the system administrator that "ST1. VOL001" and "ST2. VOL002" have different DCR settings.

Subsequently, the management apparatus 5 sets the function ID "DCR" in the apparatus management table 500 to "processed," and extracts the function ID "LUSE" as the subsequent function of the storage apparatus 4.

In this case, the management apparatus 5 refers to the AGID field 604 of the volume allocation management table 600 and the LUSE management table 1100, and compares the LUSE configuration information of "ST1. VOL001" and "ST1. VOL002." Since neither "ST1. VOL001" nor "ST2. VOL002" is a value set with LUSE, the management apparatus 5 is not required to send a warning, and sets the function ID "LUSE" as "processed."

Since the management apparatus 5 will have completed extracting all functions of the storage apparatus 4 identified with the storage apparatus ID "ST1" as a result of the foregoing process, it sets "ST1. VOL001" as "processed," and performs similar processing to the other active volumes. In this example, however, the processing is ended since there are no other active volumes.

FIG. 14 is a diagram showing an example of a warning screen presented by the function setting status monitoring program 522 in the management apparatus 5 according to an embodiment of the present invention. As explained in the foregoing operational examples, the warning screen 1400 shows that the attributes of the PPC function and the DCR function are different regarding "ST1. VOL001" and "ST2. VOL002."

The system administrator will thereby be able to recognize remote copy pair volumes that are inconsistent upon setting the function attributes regarding the volume-related functions of the storage apparatus.

(5) Function Setting Examples

Function Setting Command Program 523

The function setting examples of this embodiment are now explained.

The function setting command program 523 is a program for checking the applicability of a request upon issuing a setting request of function attributes regarding the function of the storage apparatus 4. More specifically, the function setting command program 523 receives a setting request of a prescribed function attribute to one storage apparatus 4 having remote copy pair volumes, and checks the applicability to a prescribed function of a storage apparatus 4 in a pair relationship with the foregoing storage apparatus 4. When the function setting command program 523 determines that the setting of the function attribute is applicable, it commands the setting of function attributes requested to both storage apparatuses 4. After the function setting command program 523 commands the setting of function attributes to the respective storage apparatuses 4 having remote copy pair volumes, if one of the storage apparatuses 4 could not be normally set, it re-commands the restoration of contents of the function attributes before the setting to the normally set storage apparatus 4. As described above, setting of the function attribute (function setting) includes the meaning of cancelling the function attribute.

Figure 15:
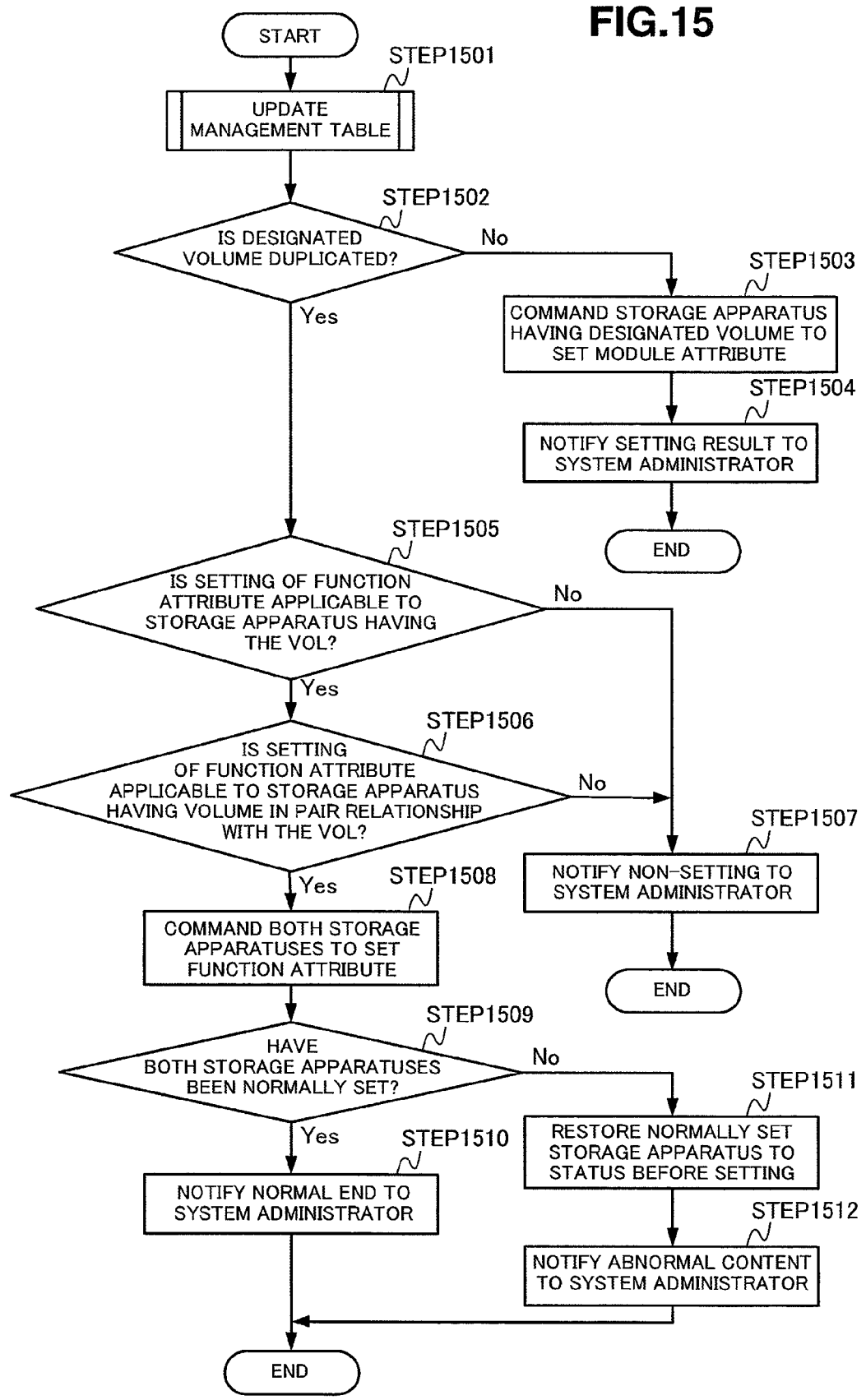
FIG. 15 is a flowchart explaining the operation of a function setting command program in the management apparatus according to an embodiment of the present invention.

FIG. 15 is a flowchart explaining the operation of the function setting command program 523 in the management apparatus 5 according to an embodiment of the present invention.

As shown in FIG. 15, foremost, when the function setting command program 523 receives a setting request of module attributes in the storage apparatus 4 designating a prescribed volume from the system administrator via the user interface, it calls the configuration information collection program 521, and updates the volume allocation management table 600, the storage area configuration management table 700, the pair management table 800, the network I/F management table 900, the cache memory management table 1000, and the LUSE management table 1100 to the latest contents (STEP 1501). In this case, the function setting command program 523 retains the contents of the set function attributes. This is because, as described later, when one of the storage apparatuses 4 could not be normally set after commanding the function setting to the storage apparatuses 4 having volumes in a pair relationship, the other normally set storage apparatus 4 can be restored to the contents of function attributes before the setting.

The function setting command program 523 thereafter refers to the pair management table 800, and confirms whether the volume designated in the setting request is a pair-defined volume (STEP 1502). In this case, the function setting command program 523 may also refer to the volume allocation management table 600, and extract the volumes used by the same application program and allocated to the same logical drive as active volumes and standby volumes, respectively. By way of this, the remote copy pair volumes having an I/O access path that can be selectively switched based on the same path alternating program in the host computer 3 will be extracted.

When the function setting command program 523 determines that the designated volume has not yet been defined as a remote copy pair volume, it sends a setting command of function attributes to the storage apparatus 4 having the foregoing volume (STEP 1503). The function setting command program 523 thereby notifies the system administrator of the setting result sent from the storage apparatus in response to the foregoing command (STEP 1504), and then ends the processing.

Contrarily, when it is determined that the volume has been defined as a remote copy pair volume, the function setting command program 523 thereafter determines whether the setting of function attributes is applicable to the volume (STEP 1505).

Specifically, the function setting command program 523 refers to the apparatus management table 500, and checks whether the storage apparatus 4 having the designated volume comprises the setting-requested function. As the setting-requested functions, for example, there are a DCR function, a PPC function, an LUSE function, and the like. When the function setting command program 523 determines that the storage apparatus 4 comprises the foregoing function, it checks whether the storage apparatus 4 comprises resources necessary for setting the function attributes. As the resources, for example, there are the unused storage capacity of the logical device formed in the storage apparatus 4, the unused cache area capacity of the cache memory 45, the unused bandwidth of the network I/F 42 and so on. The function setting command program 523 refers to the corresponding management table, and checks whether the storage apparatus 4 comprises the necessary resources for each function. The function setting command program 523 determines that the function setting is applicable when the storage apparatus 4 comprises the foregoing function and also comprises the necessary resources.

For example, if the setting-requested function is "DCR," the function setting command program 523 foremost refers to the cache memory management table 1000, calculates the unused cache area capacity of the cache memory 45 of the storage apparatus 4 designated in the setting request, and determines that there are the necessary resources for the DCR setting when the calculated unused cache area capacity is greater than the logical storage capacity of the volume to which DCR is to be set. The unused cache area capacity is sought by subtracting the sum of the values of the DCR setting information in the capacity field 10042 from the value of the capacity field 1003 regarding the designated storage apparatus 4.

When the setting-requested function is "PPC," the function setting command program 523 refers to the network I/F management table 900, calculates the unused transfer bandwidth of the network I/F 42 to which the volume designated in the setting request belongs, and determines that there are the necessary resources for the PPC setting when the calculated unused transfer bandwidth is greater than the value designated in the setting request. The unused transfer bandwidth is sought by subtracting the sum of the values of the PPC set value field 905 from the value of the maximum transfer bandwidth field 903 regarding the designated storage apparatus 4.

When the setting-requested function is "LUSE," the function setting command program 523 determines that there are necessary resources for the LUSE setting if the storage apparatus 4 has the designated capacity and the volume satisfying the RAID configuration.

When the setting-requested function is "volume creation," this means that the there is an array group having the designated capacity and RAID configuration, or such an array group can be created, and the function setting command program 523 determines that there are the necessary resources for creating the volume if the unused logical storage capacity of the array group is greater than the logical storage capacity of the designated volume.

When the function setting command program 523 determines at STEP 1505 that the setting of function attributes is not applicable, it notifies the system administrator of the non-setting (STEP 1507), and then ends the processing. Contrarily, when the function setting command program 523 determines at STEP 1505 that the setting of function attributes is applicable, it additionally refers to the pair management table 800, extracts the volume in a pair relationship with the foregoing volume, and similarly determines whether the setting of function attributes regarding the extracted volume is applicable (STEP 1506).

When the function setting command program 523 determines that the setting of function attributes requested to the volume in a pair relationship is not applicable, it notifies the system administrator of the non-setting (STEP 1507), and then ends the processing.

When the function setting command program 523 determines that the setting of function attributes requested to the volume in a pair relationship is applicable, it sends the requested function setting command to the respective storage apparatuses 4 having the volume and its remote copy pair volume (STEP 1508). Subsequently, the function setting command program 523 confirms whether the storage apparatuses 4 defined in a pair relationship have been normally set based on the completion status sent from both storage apparatuses 4 in response to the command (STEP 1509). When the function setting command program 523 confirms that both storage apparatuses 4 have been normally set, it notifies the system administrator of the normal end (STEP 1510), and then ends the processing.

When at least one of the storage apparatuses 4 indicates an abnormality in the setting result, the function setting command program 523 sends a command for returning the normally set storage apparatus 4 to a state before the setting to such storage apparatus 4 (STEP 1511). Upon receiving this command, the storage apparatus 4 restores the contents of the various management tables to the status before the function attribute setting was requested. The function setting command program 523 notifies the system administrator of the abnormal contents (STEP 1512), and then ends the processing.

The operational example of the function setting command program 523 in the case of newly creating a volume (remote copy pair volume) to be duplicated is now explained.

When newly creating a volume to be duplicated, the system administrator designates the active storage apparatus 4 and the standby storage apparatus to which the active volume and the standby volume are to be created, and designates the storage area configuration such as the capacity and RAID level of the active volume and the standby volume. When the function setting command program 523 receives a request from the system administrator to newly create a duplicated volume, it checks whether it is possible to create the requested active volume and standby volume in the respective storage apparatuses 4.

When the function setting command program 523 determines that it is possible to create the active volume and the standby volume, it refers to the pair management table 800 and confirms whether the designated active storage apparatus 4 and the standby storage apparatus 4 are defined in a pair relationship.

When the function setting command program 523 confirms that a pair relationship has been defined, it sends a command to the designated active storage apparatus 4 and standby storage apparatus 4 to create a volume according to the designated storage area configuration. Further, the function setting command program 523 sends a command to the storage apparatus 4 for copying data from the created active volume to the standby volume based on the remote copy function of both storage apparatuses 4. Upon receiving this command, the storage apparatus 4 performs initial copy based on the remote copy function. The function setting command program 523 thereafter confirms the completion status showing that both storage apparatuses 4 have been normally set. The function setting command program 523 notifies the system administrator or the normal end (STEP 1512), and then ends the processing.

As described above, the function setting command program 523 of this embodiment determines the applicability of setting the function attributes to the volume and a volume defined in a pair relationship with such volume upon setting the function attributes regarding the duplicated volume, and, when it is determined that the setting of function attributes is applicable to both volumes, the function setting command program 523 commands the setting of function attributes of both volumes to the storage apparatus 4. It is thereby possible to accurately retain the consistency of function attributes between volumes in a pair relationship.

Second Embodiment

The function setting command program 523 of the foregoing first embodiment notifies the system administrator of the non-setting in response to the function setting request regarding the designated volume if the storage apparatus having a volume in a pair relationship with such designated volume lacks the necessary resources to execute the function.

In the second embodiment, if the storage apparatus having a volume in a pair relationship lacks the necessary resources to execute the function, provided is a function setting command program 523' capable of setting as many requested function attributes as possible by waiting for the resources to be released for a given period of time.

Specifically, when the function setting command program 523' of this embodiment determines that one or both of the storage apparatuses 4 lack the necessary resources for setting the function attributes in response to the setting request of function attributes, it waits for the necessary resources to be released for a given period of time, and sends a function setting command to both storage apparatuses 4 when the resources are released and it can allocate the necessary resources within such given period of time.

Thus, while the function setting command program 523' of this embodiment processes the requests in the order received in response to the setting request of function attributes regarding a volume-related function on the one hand, it also preferentially executes processing in response to a setting cancellation request of the volume-related function.

The function setting command program 523' registers the resources to be allocated in the resource reservation management table, refers to such resource reservation management table, and confirms the status of the resources to be allocated.

Figure 16:
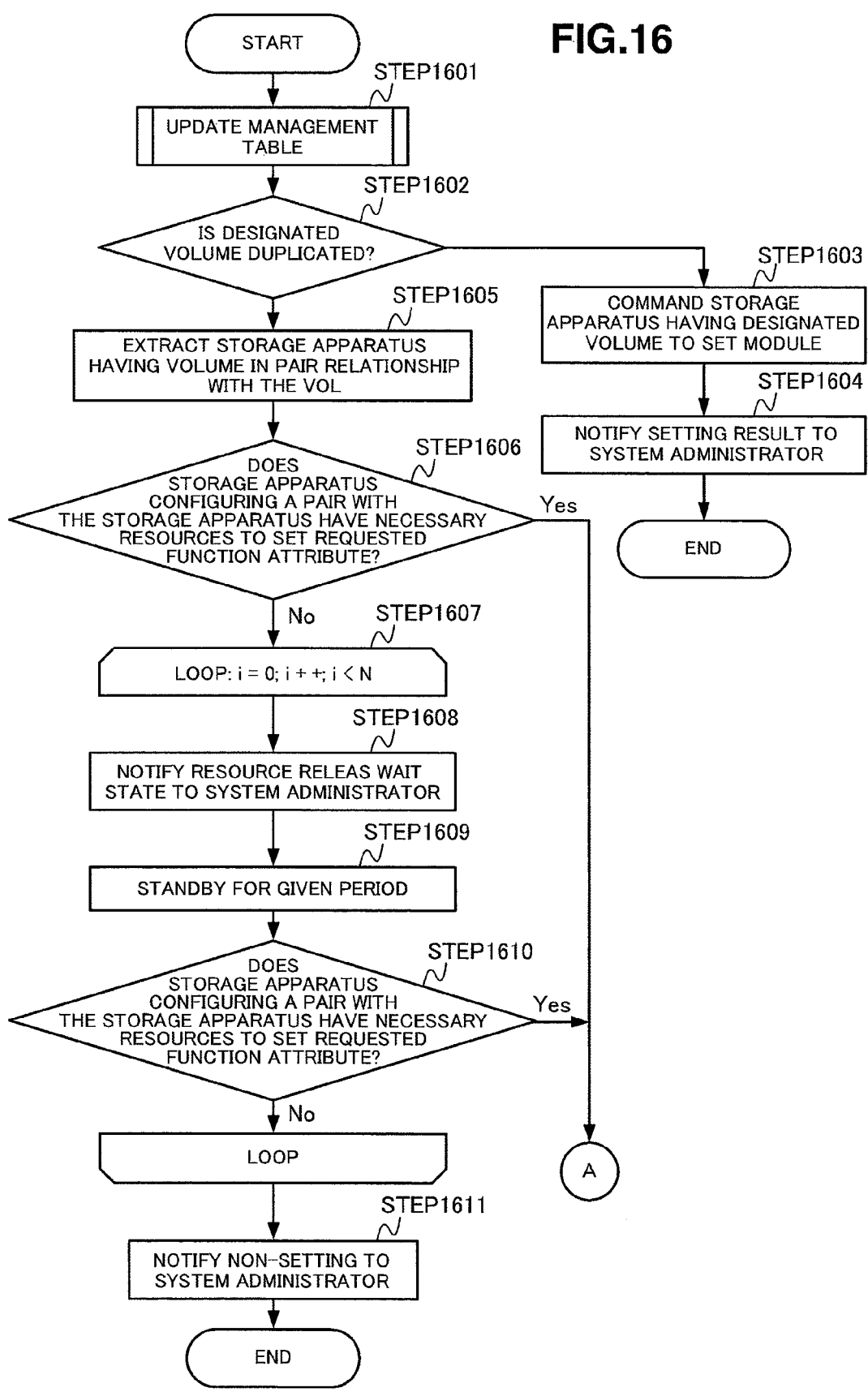
FIG. 16 is a flowchart explaining the operation of a function setting command program in the management apparatus according to an embodiment of the present invention.
Figure 17:
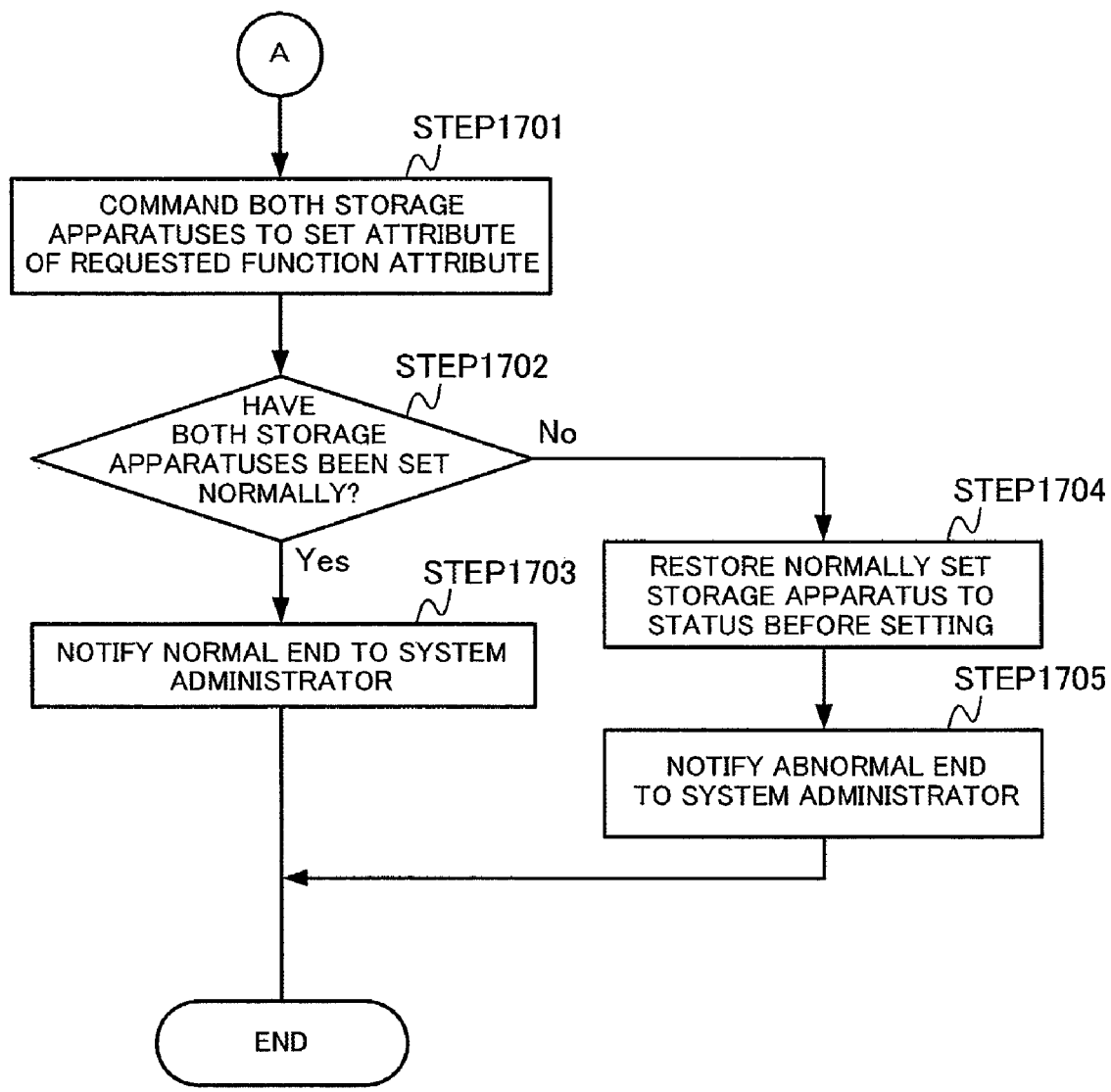
FIG. 17 is a flowchart explaining the operation of a function setting command program in the management apparatus according to an embodiment of the present invention.

FIG. 16 and FIG. 17 are flowcharts explaining the operation of the function setting command program 523' in the management apparatus 5 according to an embodiment of the present invention.

Referring to FIG. 16 and FIG. 17, foremost, when the function setting command program 523' receives a function setting request designating a prescribed volume from the system administrator via the user interface, it calls the configuration information collection program 521, and updates the volume allocation management table 600, the storage area configuration management table 700, the pair management table 800, the network I/F management table 900, the cache memory management table 1000, and the LUSE management table 1100 to the latest contents (STEP 1601).

The function setting command program 523' thereafter refers to the pair management table 800, and confirms whether the volume designated in the request is duplicated (STEP 1602). In the foregoing case, the function setting status monitoring program 522 may also refer to the volume allocation management table 600, and extract the volumes used by the same application program and allocated to the same logical drive as active volumes and standby volumes, respectively.

When the function setting command program 523' determines that the designated volume has not yet been defined in a pair relationship, it sends a setting command of the requested function attributes to the storage apparatus 4 having the foregoing volume (STEP 1603). The function setting command program 523' thereby notifies the system administrator of the setting result sent from the storage apparatus in response to the foregoing command (STEP 1604), and then ends the processing.

Contrarily, when it is determined that the volume has been defined in a pair relationship, the function setting command program 523' extracts the storage apparatus 4 having a volume in a pair relationship with the volume according to the pair management table 800 (STEP 1605).

Subsequently, the function setting command program 523' refers to the various management tables required for the setting of the requested function attributes, and determines whether the storage apparatus forming a pair with the foregoing storage apparatus possesses the necessary resources for the function setting (STEP 1606).

When it is determined that the storage apparatus does not possess the necessary resources, the function setting command program 523' sets 0 in the retry counter i, and repeats the following processing for a prescribed retry count N−1 (STEP 1607).

Foremost, the function setting command program 523' notifies the system administrator that the management apparatus 5 is in a resource release wait state (STEP 1608), and thereafter waits for the necessary resources to be released for a predetermined period of time (STEP 1609). After waiting for a given period of time, the function setting command program 523' once again refers to the various management tables corresponding to the requested function setting, and determines whether the storage apparatus forming a pair with the foregoing storage apparatus has the necessary resources for the function setting (STEP 1610).

When the function setting command program 523' determines that the resources have not yet been allocated (time-out), it increments the value of the retry counter i by 1 (STEP 1607), and performs the subsequent processing (STEP 1608 to 1610). When the value of the retry counter i reaches the prescribed retry count N, the function setting command program 523' notifies the system administrator of the non-setting (STEP 1611), and ends the processing.

When it is determined at STEP 1606 or STEP 1610 that the storage apparatus has the necessary resources, the function setting command program 523' sends the setting command of the requested function attributes to both storage apparatuses 4 (FIG. 17; STEP 1701). Upon receiving this command, the respective storage apparatuses 4 execute the setting of function attributes, and send the completion status to the management apparatus 4. The function setting command program 523' confirms whether both storage apparatuses 4 have been normally set based on the completion status sent from both storage apparatuses (STEP 1702). When the function setting command program 523' confirms that both storage apparatuses 4 have been normally set, it notifies the system administrator of the normal end (STEP 1703), and then ends the processing.

When at least one of the storage apparatuses 4 indicates an abnormality in the setting result, the function setting command program 523' sends a command for returning the normally set storage apparatus 4 to a state before the setting to such storage apparatus 4 (STEP 1704). Upon receiving this command, the storage apparatus 4 restores the contents of the various management tables to the status before the function attribute setting was requested. The function setting command program 523' notifies the system administrator of the abnormal contents (STEP 1705), and then ends the processing.

As described above, the function setting command program 523' of this embodiment continues to wait for a given period of time until the resources are allocated upon setting the function attributes of a duplicated volume, and determines that the setting of function attributes is applicable when the resources are allocated before time-out as described above. By way of this, the function attributes can be set while giving consideration to the resources that constantly change throughout the various setting processes in the storage apparatus 4.

Third Embodiment

This embodiment describes a computer system configured to include a storage controller comprising a "virtual volume function" to be provided to the host computer by disguising the volume in the storage apparatus as its own volume, which manages the function attributes regarding the volume-related function duplicated between the storage controllers.

In an environment where the virtual volume function is executed, the actual application data (data entity) to be handled by the application program in the host computer is stored in a volume formed in the physical device of the storage apparatus, and mapping information of the volume in the storage apparatus storing the data entity is stored in the volume provided by the storage controller associated with the volume.

In the following explanation, a volume formed in the physical device of the storage apparatus is referred to as a "real volume" (R-VOL), and a volume associated with the real volume and provided by the storage controller to the host computer is referred to as a "virtual volume" (V-VOL).

A virtual volume being used by the application program of the host computer 3 is referred to as an active virtual volume, and the storage controller 6 that provides the active virtual volume is referred to as an active storage controller. Further, a virtual volume provided by another storage controller 6 and sharing the real volume associated with the active virtual volume; namely, a virtual volume associated with the external volume is referred to as a standby virtual volume, and the storage controller 6 providing the standby virtual volume is referred to as a standby storage controller.

(1) System Configuration (1-1) Configuration of Computer System

Figure 18:
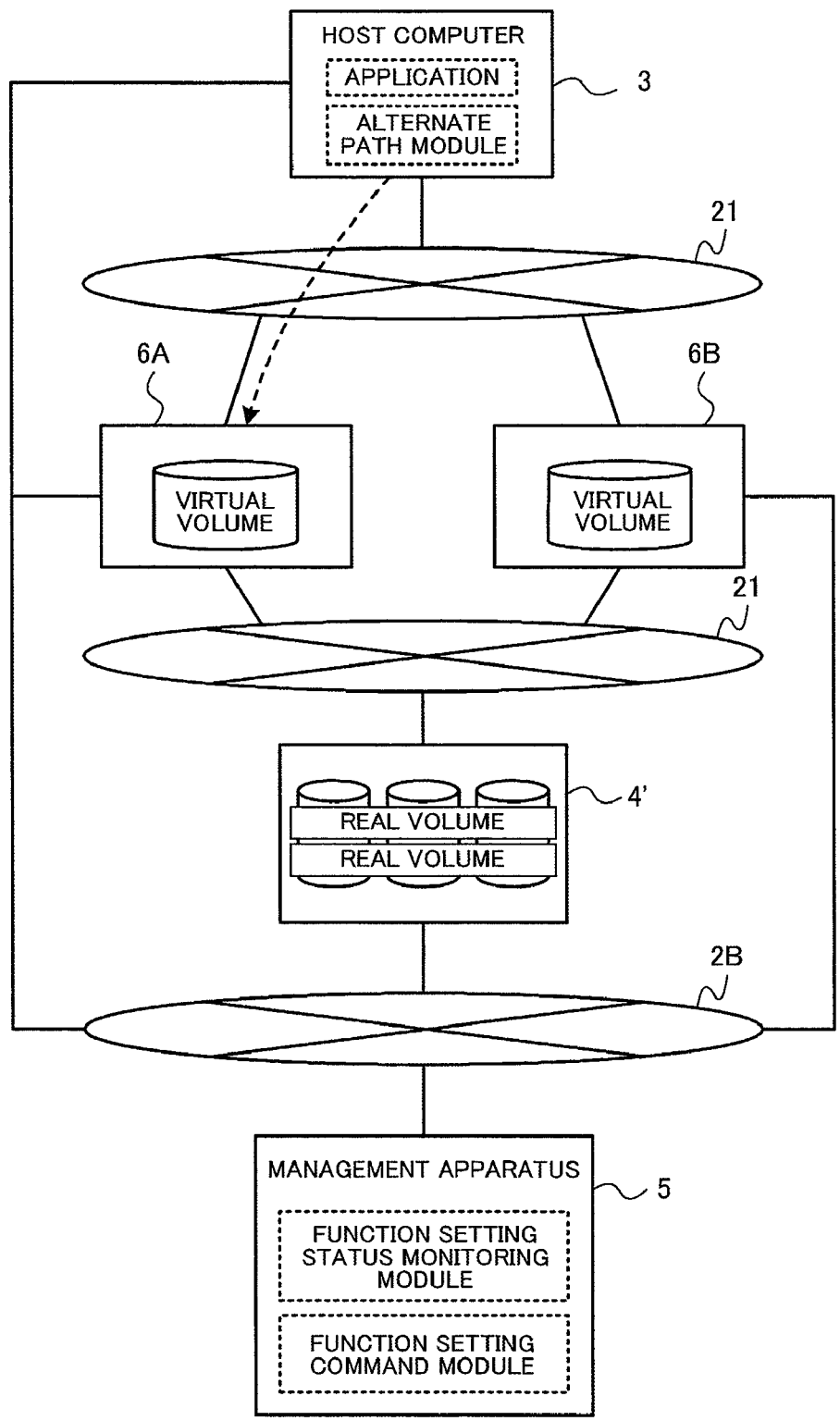
FIG. 18 is a diagram showing the configuration of a computer system according to an embodiment of the present invention.

FIG. 18 is a diagram showing a configuration of the computer system 1 according to an embodiment of the present invention. In the computer system 1 of this embodiment, at least two or more external storage controllers 6 that control the storage apparatuses comprising physical devices provide the logical volume in the storage apparatus as a virtual volume to the host computer by using the virtual volume function.

As shown in FIG. 18, the computer system 1 comprises two or more storage controllers 6 connected to the host computer 3 via the first storage network 21, and storage apparatuses 4' externally connected to the storage controllers 6 via a second storage network 22. The computer system 1 further comprises a management apparatus 5 connected to the host computer 3, the storage apparatus 4', and the storage controller 6 via the management network 2B.

The first storage network 21, as with the foregoing storage network 2A, is used for the communication based on an I/O access between the host computer 3 and the storage controller 6. The second storage network 22 is used for the communication based on an I/O access between the storage controller 6 and the storage apparatuses 4'. In this embodiment, the first storage network 21 and the second storage network 22 may be configured from a fibre channel protocol-based SAN (FC-SAN). In FIG. 18, although the first storage network 21 and the second storage network 22 are illustrated as separate networks, they may also be configured from the same storage network. However, even in cases where they are configured from the storage network, the host computer 3 does not directly I/O access the storage apparatuses 4', and is configured to I/O access the storage apparatuses 4' under the control of the storage controller 6.

The management network 2B is a network to be used for the communication upon the management apparatus 5 managing the respective apparatuses in the computer system 1. In this embodiment, the management network 2B may be configured from an IP protocol-based LAN.

The host computer 3 of this embodiment may also comprise an alternate path module in the computer system 1 of this embodiment. Thus, when a failure or maintenance work arises in the active storage controller and the host computer 3 is not able to use the active virtual volume, the alternate path program in the host computer 3 realizes the nondisruptive operation of the application programs by switching the I/O access path to the standby virtual volume provided by the standby storage controller.

The external volume-related function of the storage apparatuses 4' in this embodiment is dependent on the setting of function attributes regarding the functions of the storage controller 6 providing the virtual volume associated with the real volume.

(1-2) Configuration of Storage Controller

Figure 19:
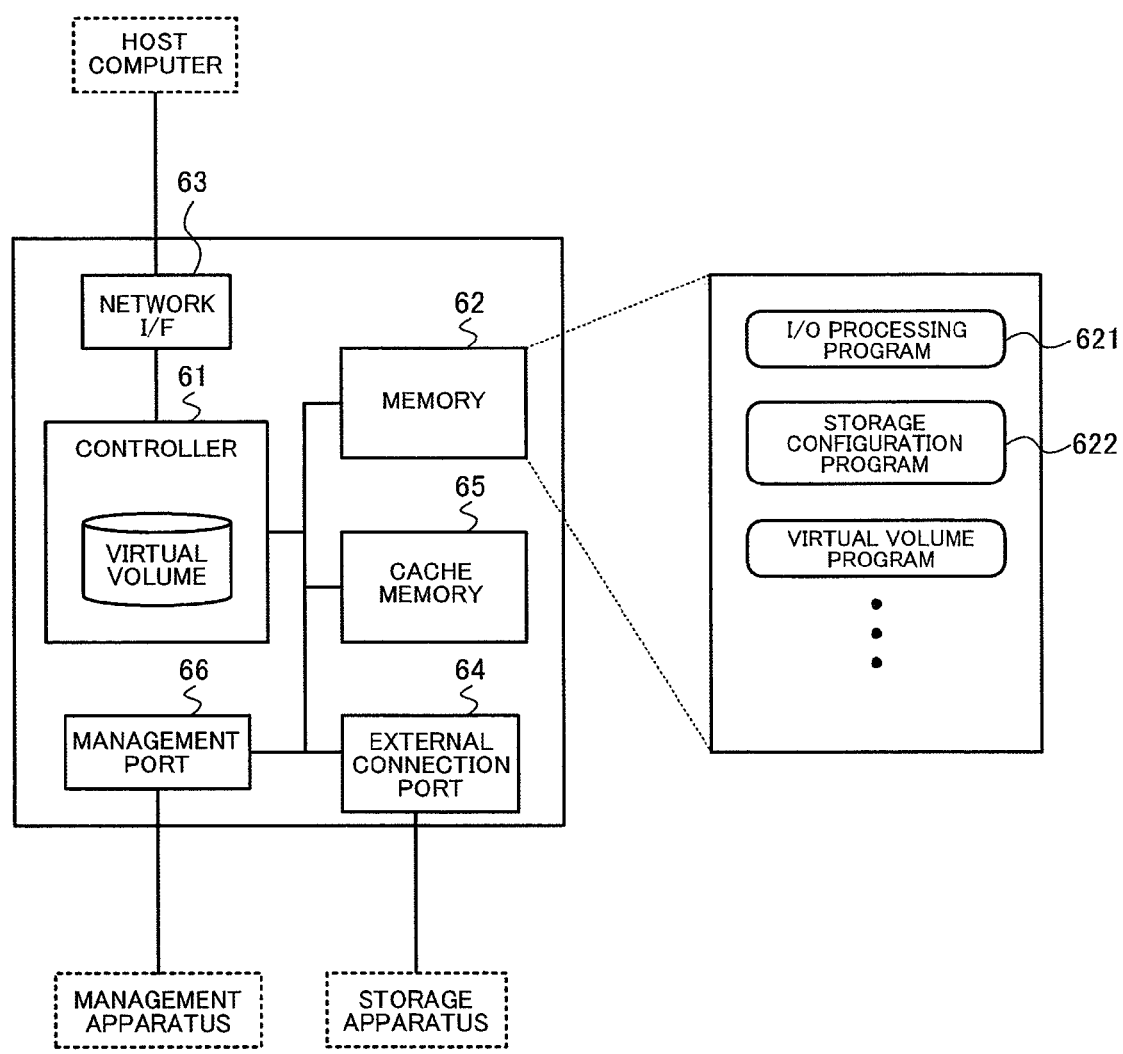
FIG. 19 is a diagram showing the configuration of a storage controller in the computer system according to an embodiment of the present invention.

FIG. 19 is a diagram showing a configuration of a storage controller 6 in the computer system 1 according to an embodiment of the present invention. As shown in FIG. 19, the storage controller (SC) 6 comprises an internal controller 61 for controlling the overall storage controller 6, a memory 62 that serves as a main memory of the internal controller 61, one or more network interfaces 63 for connecting to the first storage network 21, one or more external connection ports 64 for connecting to the second storage network 22, a cache memory 65, and a management port 66 for connecting to the management network 2B.

The memory 62 is configured from, for example, a RAM and/or a ROM, and stores various programs and data to be used by the processor (not shown) of the internal controller 61. The various programs are arbitrarily loaded into the memory 62 in part or in whole from an auxiliary storage apparatus not shown. FIG. 19 representatively shows an I/O processing program 621, a storage configuration program 622, and a virtual volume program 623.

The basic functions of the I/O processing program 621 and the storage configuration program 622 are the same as the foregoing I/O processing program 421 and the storage configuration program 422, and only differ regarding the part concerning the processing to be performed to the externally connected storage apparatuses 4'.

The virtual volume program 623 provides the volume (external volume) in the storage apparatus 4' as the virtual volume in the storage controller 6 to the host computer 3. The storage controller 6 forms a virtual volume in relation to the external volume of the storage apparatus 4' by executing the virtual volume program 623, converts the address of the virtual volume shown by the I/O access into an address of the external volume when there is an I/O access from the host computer 3 to the virtual volume, and thereby realizes the I/O access to the external volume.

(1-3) Configuration of Management Apparatus 5

Figure 20:
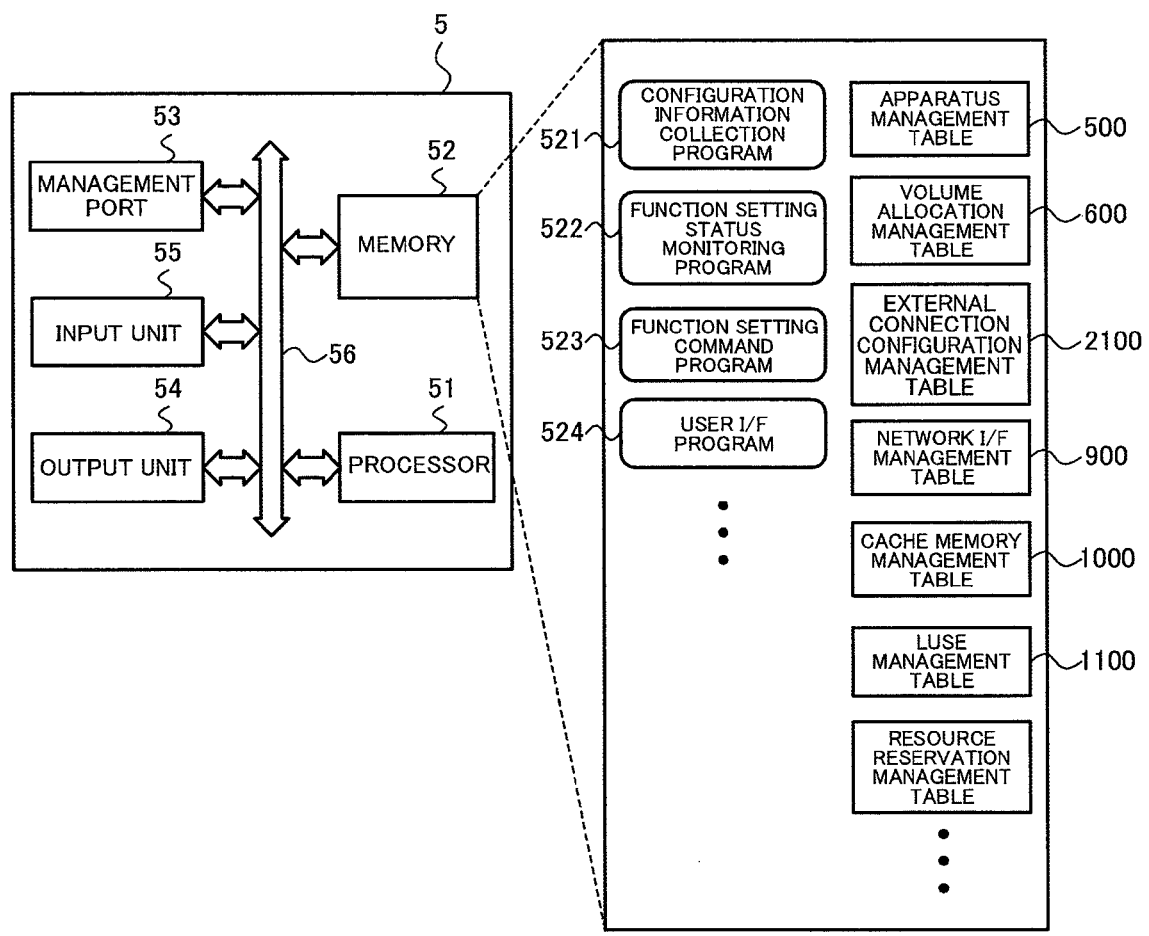
FIG. 20 is a diagram showing the configuration of a management apparatus in the computer system according to an embodiment of the present invention.

FIG. 20 is a diagram showing a configuration of the management apparatus 5 according to an embodiment of the present invention. The configuration of the management apparatus 5 of this embodiment is the same as the foregoing embodiments, but the programs to be executed and the management tables are different. Specifically, the management apparatus 5 of this embodiment retains an external connection configuration management table 2100 in substitute for retaining the storage area configuration management table 700 and the pair management table 800.

(2) External Connection Configuration Management Table 2100

FIG. 21 is a diagram showing an example of the external connection configuration management table 2100 in the management apparatus 5 according to an embodiment of the present invention. The external connection configuration management table is a table for managing the relation of the storage controller 6 and the storage apparatus 4, and the relation of the virtual volume and external volume provided by the storage controller 6.

As shown in FIG. 21, the external connection configuration management table 2100 is configured from a storage controller ID field 2101 for registering identifiers for uniquely identifying the storage controller 6 in the management apparatus 5, a virtual volume ID field 2102 for registering identifiers for uniquely identifying the virtual volume of the storage controller 6 in the storage controller 6, an external connection storage apparatus ID field 2103 for registering identifiers for uniquely identifying the external connection storage apparatus storing the external volume of the virtual volume in the management apparatus 5, and an external volume ID field 2104 [for registering identifies] for uniquely identifying the external volume of the virtual volume in the external connection storage apparatus 4.

When the fields other than the storage controller ID field 2101 and the external connection storage apparatus ID field 2103 (i.e., the virtual volume ID field 2102 and external volume ID field 2104 in this example) are null, this shows that the storage controller 6 and the external connection storage apparatus are of an external connection relation (correspondence relation).

The management apparatus 6 creates and updates the external connection configuration management table 2100 by executing the configuration information collection program 523.

(3) Explanation on Operation of Programs

The programs for managing the function attributes of all virtual-volume related functions sharing the external volume are now explained.

(3-1) Configuration Information Collection Program 521

The configuration information collection program 521 is a program for collecting the configuration information from the storage apparatus 4 and the host computer 3. The configuration information collection program 521 is periodically executed under the control of the processor of the management apparatus 5. Otherwise, the configuration information collection program 521 may also be executed based on an execution command from the system administrator, or according to a call from another program in the management apparatus 5.

Specifically, the configuration information collection program 521 refers to the apparatus management table 500, and issues a configuration information request to all storage controllers 6 and the host computer 3 registered in the apparatus ID field 501 using the IP addresses of the IP address field 504. The storage controller 6 that received the configuration information request collects its own configuration information by executing the storage configuration program, and sends such configuration information to the management apparatus 5. Similarly, the host computer 3 that received the configuration information request collects its own configuration information, and sends such configuration information to the management apparatus 5. The configuration information collection program 521 updates the corresponding fields of various management tables including the volume allocation management table 600, the storage area configuration management table 700, the pair management table 800, the network I/F management table 900, the cache memory management table 1000, and the LUSE management table 1100 based on the configuration information sent from the respective apparatuses to be managed by the management apparatus 5.

(3-2) Function Setting Status Monitoring Program 522

The function setting status monitoring program 522 of this embodiment has been applied to an external connection storage apparatus. The function setting status monitoring program 522 of this embodiment confirms the consistency of the function attributes as with the foregoing embodiments upon setting the virtual volume-related function attributes sharing the external volume.

Figure 22:
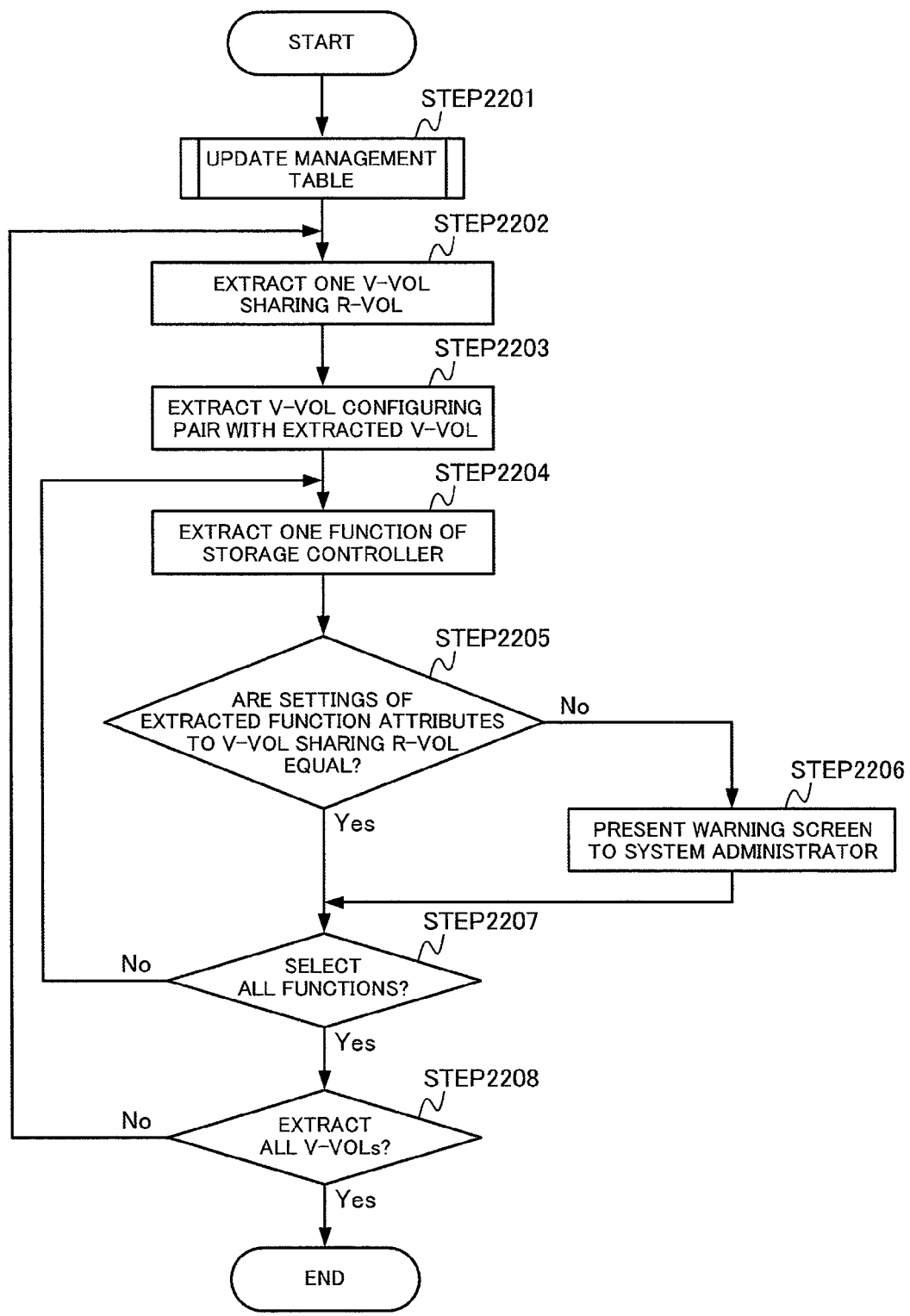
FIG. 22 is a flowchart explaining the operation of a function setting status program in the management apparatus according to an embodiment of the present invention.

FIG. 22 is a flowchart explaining the operation of the function setting status monitoring program 522 in the management apparatus 5 according to an embodiment of the present invention.

As shown in FIG. 22, when the function setting status monitoring program 522 is executed, it calls the configuration information collection program 523, and updates the various management tables to the latest contents (STEP 2201).

The function setting status monitoring program 522 thereafter refers to the external connection configuration management table 2100, and extracts an active virtual volume sharing the external volume (STEP 2202). The function setting status monitoring program 522 further extracts a standby virtual volume sharing the extracted active virtual volume and its corresponding external volume (STEP 2203).

Subsequently, the function setting status monitoring program 522 extracts one virtual volume-related function provided by the active storage controller 6 (STEP 2204). The function setting status monitoring program 522 thereafter confirms whether the setting of function attributes pertaining to the active virtual volume and the standby virtual volume is equal (STEP 2205).

When the function setting status monitoring program 522 determines that the extracted function attributes are not equal, it presents to the system administrator a warning screen showing that the settings of the function attributes of the active virtual volume and the standby virtual volume are different (STEP 2206).

The function setting status monitoring program 522 determines whether all function related to the virtual volume have been extracted (STEP 2207), and, when there is a function that has not yet been extracted (STEP 2207; No), it returns to the processing at STEP 2204. Further, when the function setting status monitoring program 522 determines that all function have been extracted (STEP 2207; Yes), it additionally determines whether all active virtual volumes have been extracted (STEP 2208). If there is an active virtual volume that has not yet been extracted (STEP 2208; No), the function setting status monitoring program 522 returns to the processing at STEP 2202. When the function setting status monitoring program 522 determines that all active virtual volumes have been extracted (STEP 2208; Yes), it ends the function setting status monitoring processing.

(3-3) Function Setting Command Program 523

The function setting command program 523 of this embodiment is a modification of the foregoing function setting command monitoring program 523 so that it will be applicable to a storage system configured from the storage apparatuses 4' externally connected to the storage controller 6. Specifically, the function setting command program 523 of this embodiment confirms the consistency of the function attributes as with the foregoing embodiments upon setting the virtual volume-related function attribute sharing the external volume, and maintains the function attributes by restoring the function attributes to the function attributes before the setting when it is determined that there is no consistency.

Figure 23:
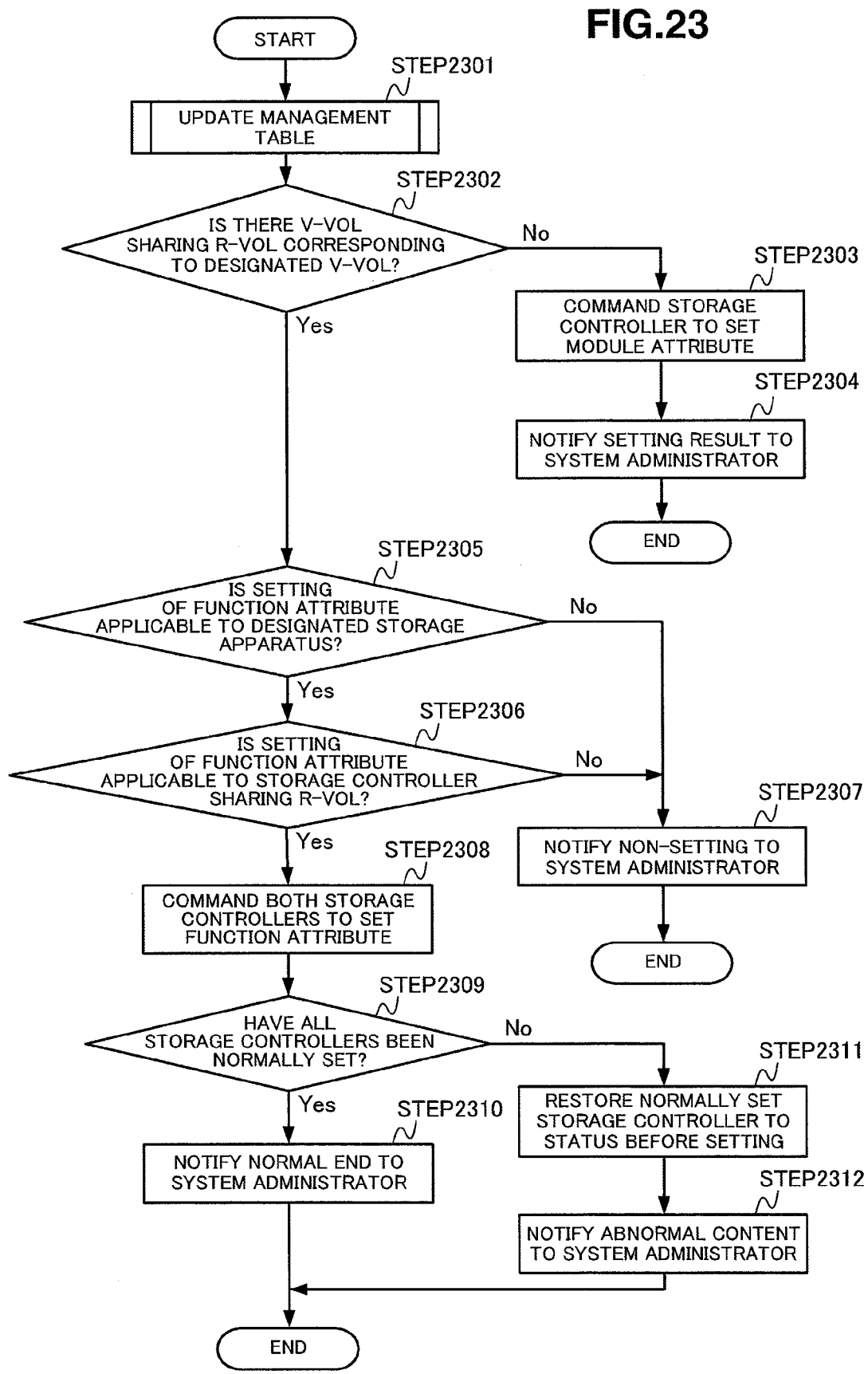
FIG. 23 is a flowchart explaining the operation of a function setting command program in the management apparatus according to an embodiment of the present invention.

FIG. 23 is a flowchart explaining the operation of the function setting command program 523 in the management apparatus 5 according to an embodiment of the present invention.

As shown in FIG. 23, foremost, when the function setting command program 523 receives a function setting request designating a prescribed volume from the system administrator via the user interface, it calls the configuration information collection program 521, collects the configuration information, and updates the various management tables (STEP 2301).

The function setting command program 523 thereafter refers to the external connection configuration management table 2100, and confirms whether there is a virtual volume sharing the real volume corresponding to the virtual volume designated in the setting request of function attributes (STEP 2302).

When the function setting command program 523 determines that there is no virtual volume sharing the real volume corresponding to the designated virtual volume, it sends a setting command of function attributes to the storage controller 6 handling the designated virtual volume (STEP 2303). The function setting command program 523 thereafter notifies the system administrator of the setting result sent from the storage controller 6 in response to the command (STEP 2304), and then ends the processing.

When it is determined that there is a virtual volume sharing the external volume corresponding to the designated virtual volume, the function setting command program 523 determines whether the setting of requested function attributes is applicable to the storage controller 6 providing the virtual volume designated in the setting request of function attributes (STEP 2304). As the determination processing at STEP 2304, the same determination as the applicability determination of the setting of the requested function attributes to the foregoing storage apparatus 4 may be applied.

When it is determined that the setting of the requested function attributes is not applicable, the function setting command program 523 notifies the system administrator of the non-setting (STEP 2307), and then ends the processing. Further, when the function setting command program 523 determines that the setting of requested function attributes is applicable at STEP 2305, it further refers to the external connection configuration management table 2100, extracts the storage controller 6 providing the virtual volume sharing the real volume with the designated virtual volume, and determines whether the requested function setting is applicable to the extracted storage controller 6 (STEP 2306).

When the function setting command program 523 determines that function setting requested regarding the virtual volume sharing the real volume is not applicable, it notifies the system administrator of the non-setting (STEP 2307), and ends the processing.

When it is determined that the requested function setting is applicable, the function setting command program 523 sends a command for setting the requested function attributes to the storage controller 6 providing the virtual volume designated in the setting request of function attributes and all storage controllers 6 providing the virtual volume sharing the external volume with the foregoing virtual volume (STEP 2308). The function setting command program 523 thereafter confirms whether all storage controllers 6 have been normally set based on the completion status sent from all storage controllers 6 in response to the foregoing command (STEP 2309). When the function setting command program 523 confirms that all storage controllers 6 have been normally set, it notifies the system administrator of the normal end (STEP 2310), and then ends the processing.

When at least one of the storage controllers 6 indicates an abnormality in the setting result, the function setting command program 523 sends a command for returning the normally set storage controller 6 to a state before the setting to such storage controller 6 (STEP 2311). Upon receiving this command, the storage controller 6 restores the contents of the various management tables to the state before the function attribute setting was requested. The function setting command program 523 notifies the system administrator of the abnormal contents (STEP 2312), and then ends the processing.

Thus, the consistency of the function attributes can be retained for all virtual volume-related functions sharing the external volume.

The foregoing embodiments are exemplifications for explaining the present invention, and are not intended to limit the scope of the present invention. The present invention may be implemented in various modes so as long as it does not deviate from the gist of this invention.

For example, to modify the foregoing function setting command program 523' for allocating the resource so that it is applicable to a storage system configured from the storage apparatus 4' connected externally to the storage controller 6 is within the scope of the present invention.

The present invention can be broadly applied to a storage system that provides to a host computer an active logical volume and a standby logical volume in different storage apparatuses associated as remote copy pair volumes.

The present invention can also be broadly applied to a storage system that provides a logical volume in the storage apparatus as a virtual volume to the host computer.

What is claimed is:

1. A storage system, comprising:
a first storage apparatus having at least one volume to be provided to a host computer;
a second storage apparatus connected to the first storage apparatus and having a second volume having a pair relationship with a first volume in the first storage apparatus; and
a management apparatus connected to the first storage apparatus and the second storage apparatus, and configured to manage the first storage apparatus and the second storage apparatus;
wherein the management apparatus includes a user interface for setting an attribute of a function related to at least one volume of the first storage apparatus and an attribute of a function related to at least one volume of the second storage apparatus;
wherein the management apparatus compares an attribute of a first function related to the first volume and an attribute of a second function related to the second volume;
wherein, if the acquired attribute of the first function and the acquired attribute of the second function differ, the management apparatus outputs information concerning a difference to the user interface;
wherein the management apparatus uses the result of the comparison to set the attribute of the second function related to the second volume to be consistent with the attribute of the first function related to the first volume, for the first volume and the second volume having the pair relationship; and
wherein, after the set the attribute operation, the management apparatus determines whether the first volume and the second volume have been each set normally, and when at least one of the first volume and the second volume could not be set normally, commands restoration of the first volume or the second volume that has set normally, to a state before the set the attribute operation.

2. The storage system according to claim 1,
wherein the first storage apparatus retains the attribute of the first function related to the first volume;

wherein the second storage apparatus retains the attribute of the second function related to the second volume; and wherein the management apparatus respectively acquires the attribute of the first function and the attribute of the second function from the first storage apparatus and the second storage apparatus, and compares the acquired attribute of the first function and the acquired attribute of the second function.

3. The storage system according to claim 1, wherein the function includes at least one of: a volume creation function, a band limiting function, a cache residency function, a volume expansion function, and a remote copy function.

4. A storage system, comprising:
a storage apparatus having a real volume formed in a storage medium holding a data entity to be handled in a host computer;
a first storage controller connected to the storage apparatus and configured to control the storage apparatus;
a second storage controller connected to the storage apparatus and configured to control the storage apparatus; and
a management apparatus connected to the storage apparatus, the first storage controller and the second storage controller, and configured to manage the storage apparatus, the first storage controller and the second storage controller,
wherein the first storage controller includes a first virtual volume associated with the real volume, the first virtual volume being provided to an application program in the host computer,
wherein the second storage controller includes a second virtual volume associated with the real volume, the second virtual volume being provided to an application program in the host computer and having a pair relationship with the first virtual volume, and
wherein the management apparatus receives a setting request of an attribute of a function related to the first virtual volume directed to the first storage controller via the user interface, and uses the setting request to set the attribute;
wherein the management apparatus compares an attribute of a first function related to the first virtual volume and an attribute of a second function related to the second virtual volume;

wherein, if the acquired attribute of the first function and the acquired attribute of the second function differ, the management apparatus outputs information concerning a difference to the user interface; and wherein the management apparatus uses the result of the comparison to set the attribute of the second function related to the second virtual volume to be consistent with the attribute of the first function related to the first virtual volume, for the first virtual volume and the second virtual volume having the pair relationship; and wherein, after the set the attribute operation, the management apparatus determines whether the first virtual volume and the second virtual volume have been each set normally, and when at least one of the first virtual volume and the second virtual volume could not be set normally, commands restoration of the first virtual volume or the second virtual volume that has set normally, to a state before the set the attribute operation.

5. The storage system according to claim 4,
wherein the management apparatus determines whether the first storage controller and said second storage controller can allocate a resource necessary to set the attribute of the function in the received setting request.

6. The storage system according to claim 5,
wherein when the management apparatus determines that the first storage controller and said second storage controller are not able to allocate the necessary resource, the management apparatus waits for a given period of time, and thereafter once again determines whether the first storage controller and the second storage controller can allocate the necessary resource.

7. The storage system according to claim 6,
wherein when the management apparatus determines that the first storage controller and the second storage controller can allocate the necessary resource, the management apparatus commands function setting to the first storage controller and the second storage controller.

8. The storage system according to claim 4, wherein the function includes at least one of: a volume creation function, a band limiting function, a cache residency function, a volume expansion function, and a remote copy function.

* * * * *